July 13, 1937.  F. ASHWORTH  2,086,526
METHOD OF AND MEANS FOR USE IN MANUFACTURING FOOTWEAR
Filed Dec. 31, 1935   8 Sheets-Sheet 1
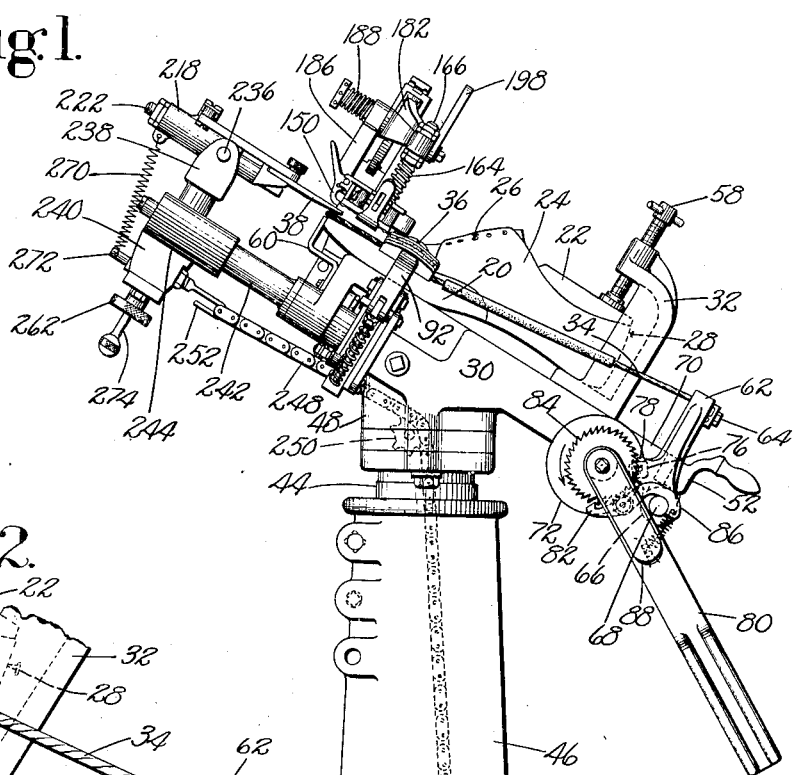
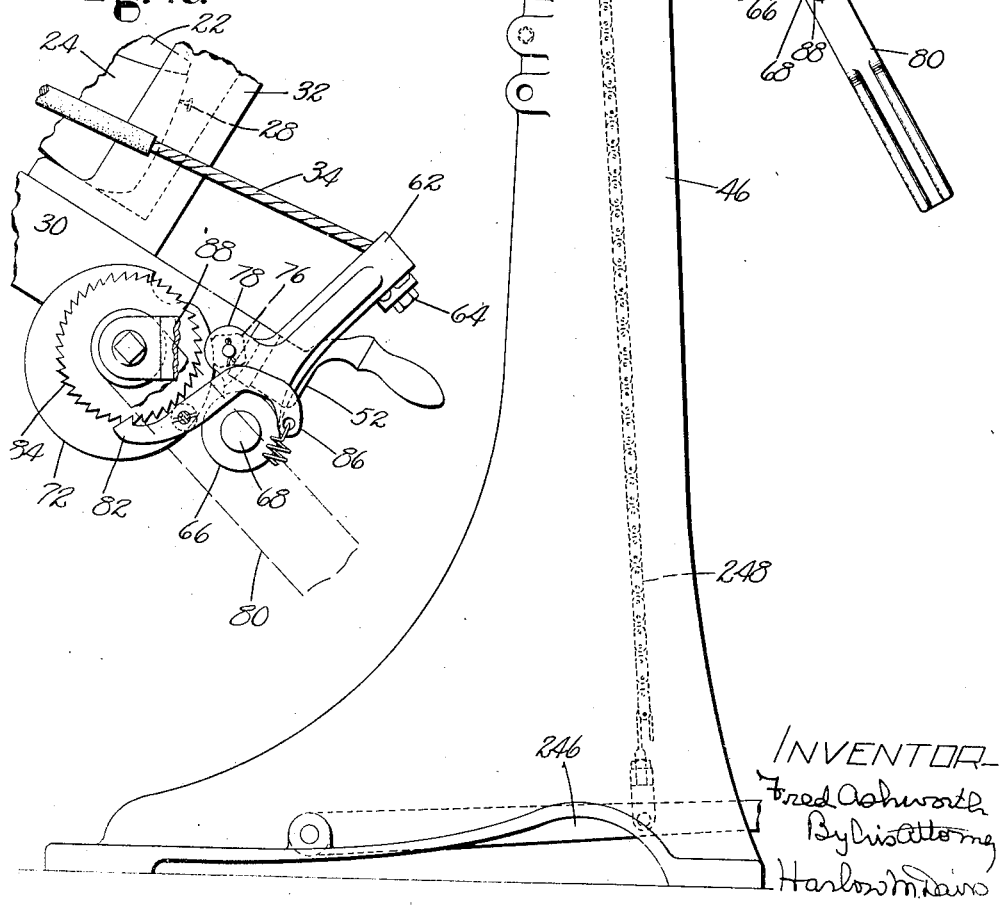

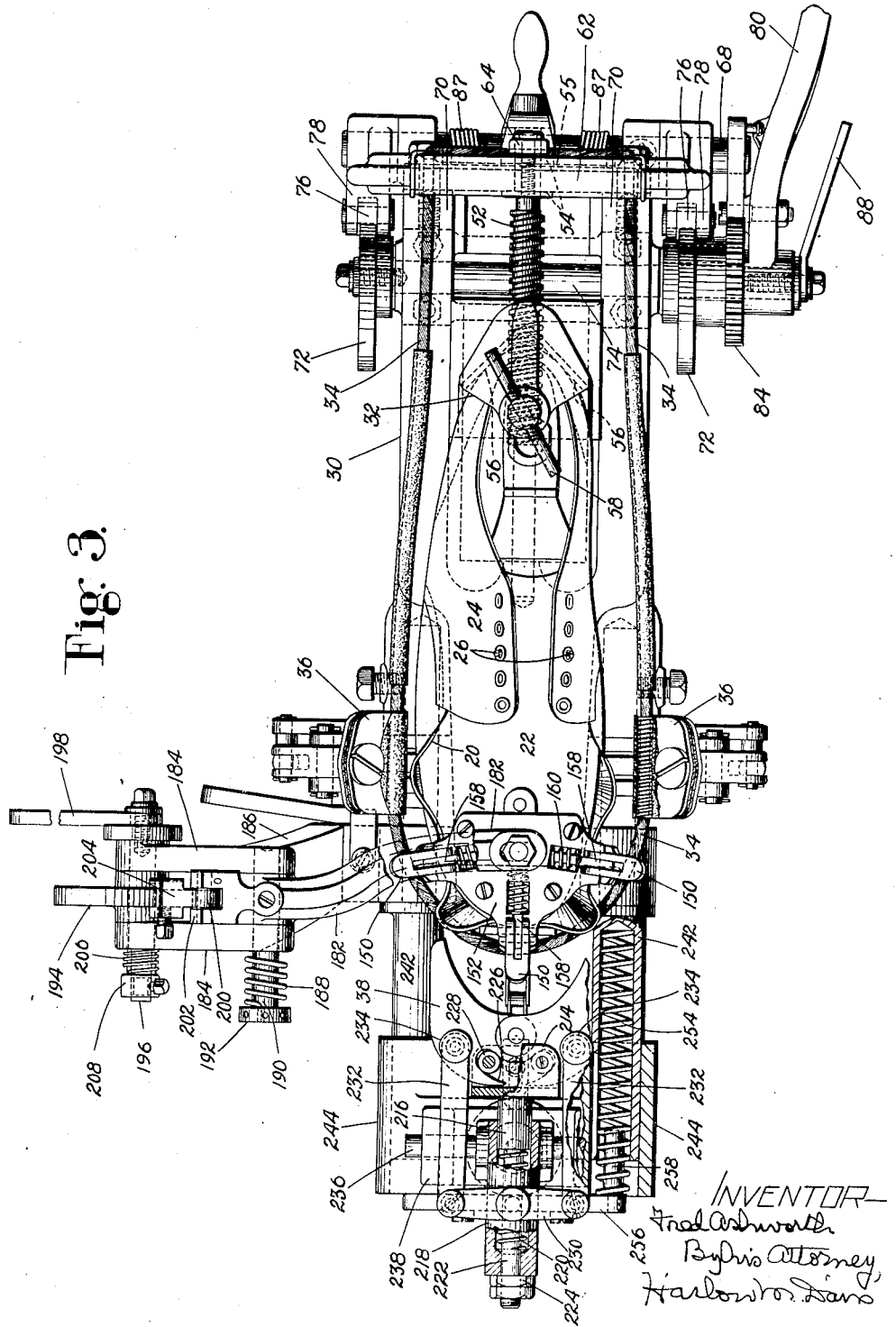

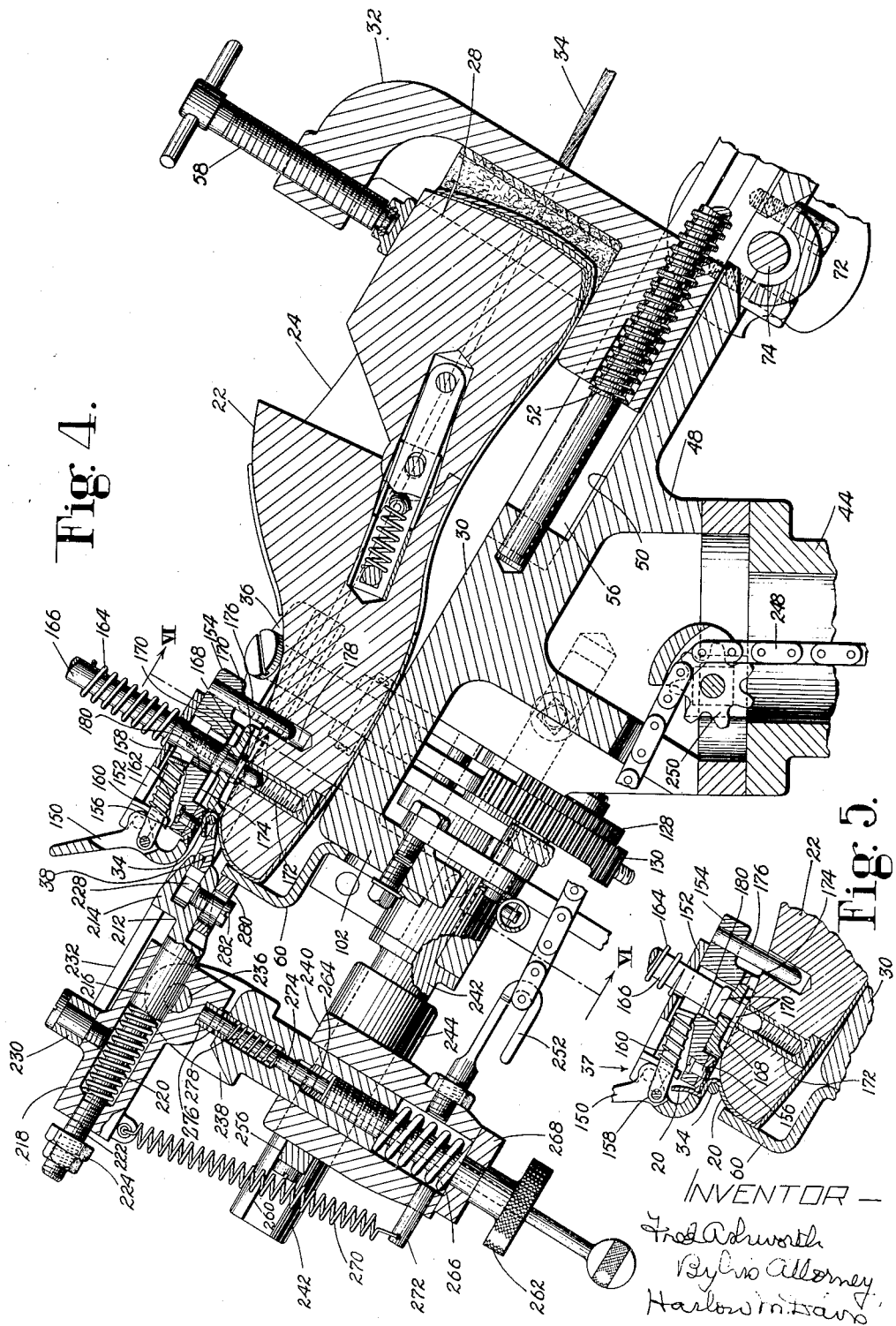

July 13, 1937.  F. ASHWORTH  2,086,526
METHOD OF AND MEANS FOR USE IN MANUFACTURING FOOTWEAR
Filed Dec. 31, 1935  8 Sheets-Sheet 4

INVENTOR
Fred Ashworth
By his Attorney
Harlow M Davis

July 13, 1937.  F. ASHWORTH  2,086,526
METHOD OF AND MEANS FOR USE IN MANUFACTURING FOOTWEAR
Filed Dec. 31, 1935  8 Sheets-Sheet 5
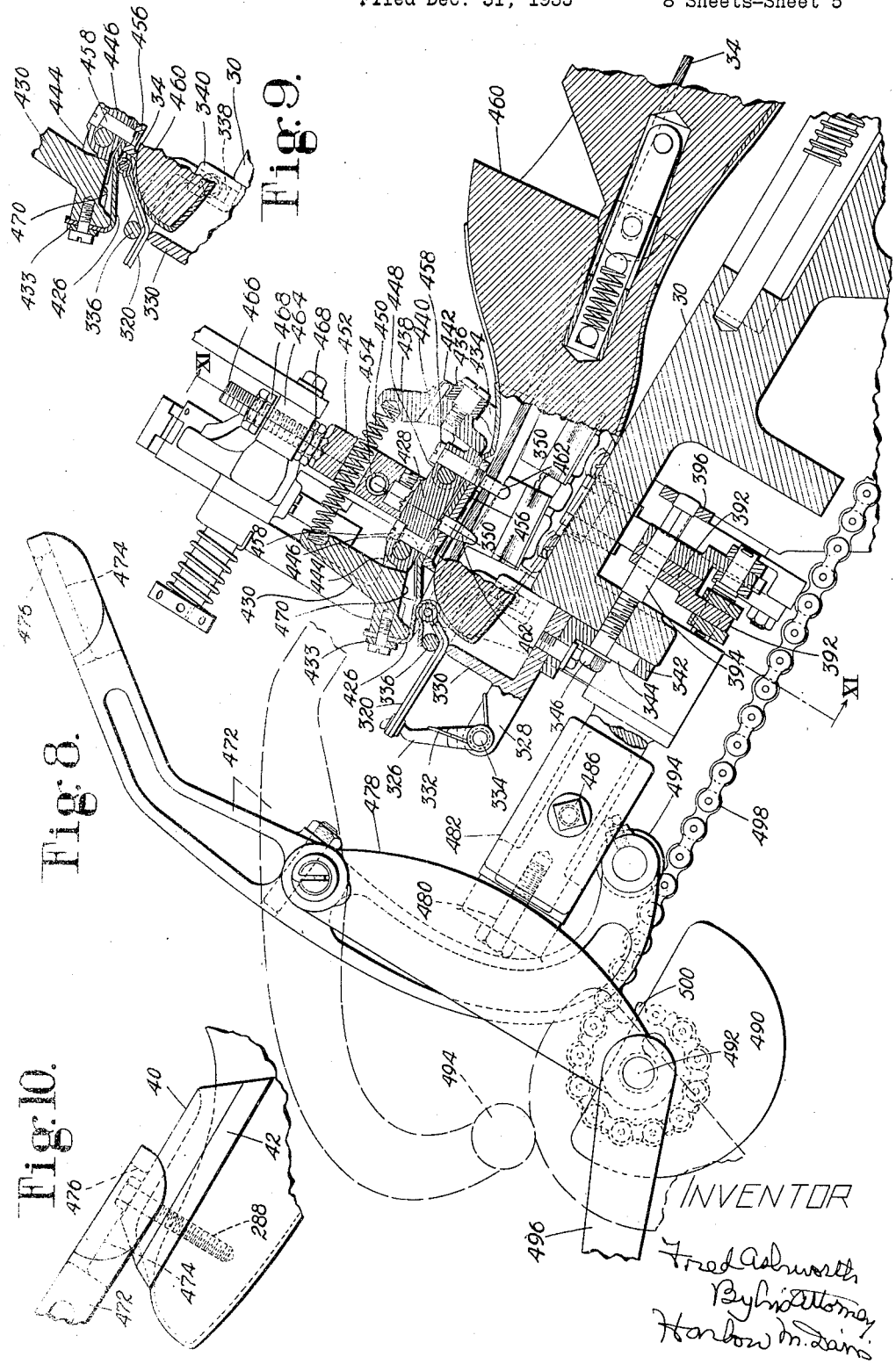

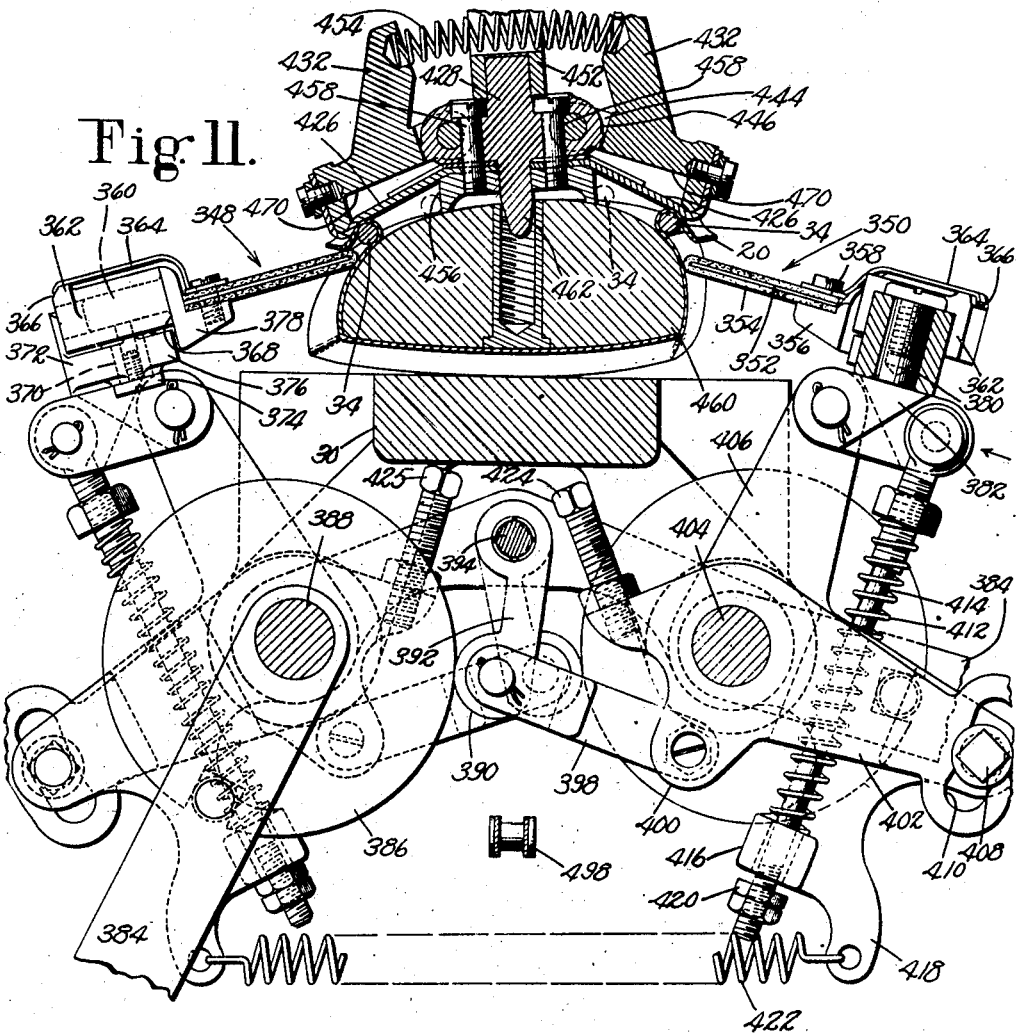

July 13, 1937.  F. ASHWORTH  2,086,526
METHOD OF AND MEANS FOR USE IN MANUFACTURING FOOTWEAR
Filed Dec. 31, 1935  8 Sheets-Sheet 7

INVENTOR
Fred Ashworth
By his Attorney
Harlow M. Davis

July 13, 1937. F. ASHWORTH 2,086,526
METHOD OF AND MEANS FOR USE IN MANUFACTURING FOOTWEAR
Filed Dec. 31, 1935 8 Sheets-Sheet 8
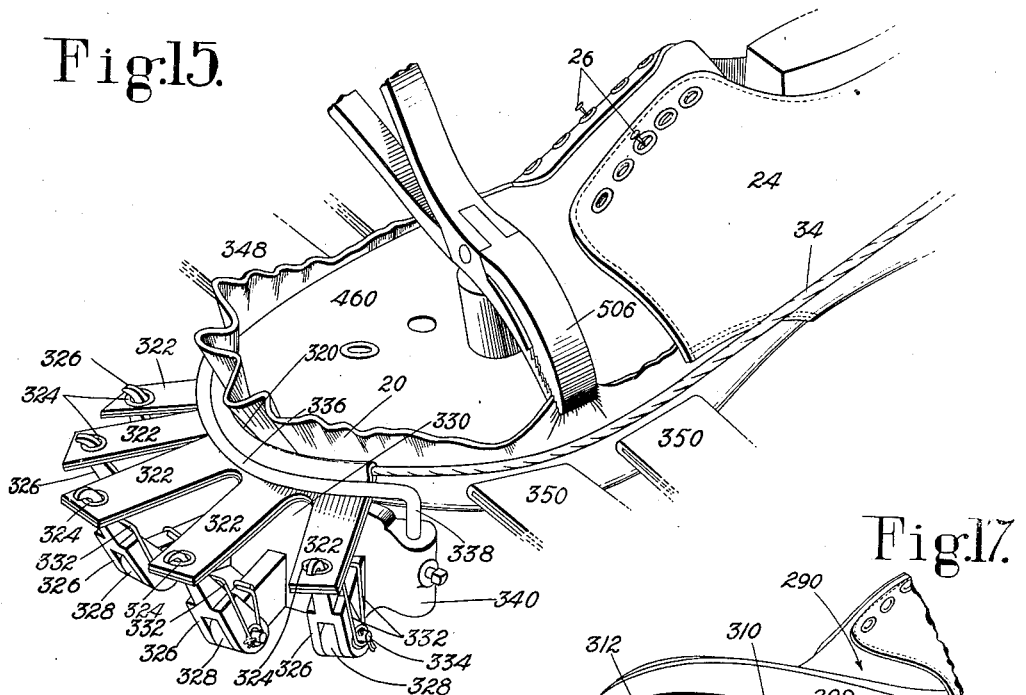
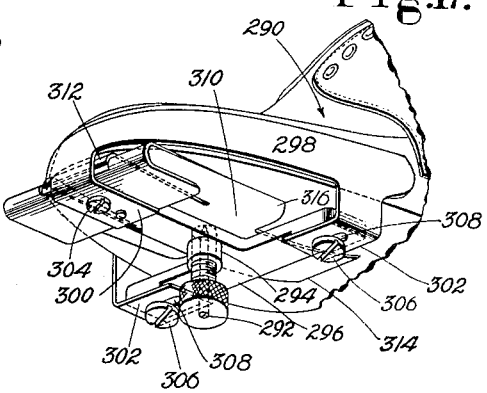

Patented July 13, 1937

2,086,526

UNITED STATES PATENT OFFICE 2,086,526

METHOD OF AND MEANS FOR USE IN MANUFACTURING FOOTWEAR

Fred Ashworth, Wenham, Mass., assignor to United Shoe Machinery Corporation, Paterson, N. J., a corporation of New Jersey Application December 31, 1935, Serial No. 56,955

69 Claims. (Cl. 12—7)

The present invention relates to methods of and means for use in manufacturing footwear and is herein illustrated in its application to the manufacture of moccasins. The term "moccasin" as hereinafter employed includes all types of footwear whereby the portion of the bottom of the foot from the region of the ball forwardly is provided with an integral covering the marginal portions of which extend upwardly and inwardly over the sides or the sides and top of the forepart of the foot, such foot-bottom covering being hereinafter identified as the "moccasin bottom".

Objects of the present invention are to substitute machine methods for hand methods in the manufacture of moccasins, particularly in the operation of shaping moccasins on their lasts and thereby to increase production and to promote uniformity of the product.

In its application to machines for shaping moccasins over lasts the present invention provides means for lasting the toe end of a moccasin bottom, wipers constructed and arranged to operate locally on the sides of the forepart of the moccasin bottom, and means for effecting relative movement of the wipers and the last heightwise of the last in a direction to wipe the material of the moccasin toward the top of the forepart of the last. This application discloses two forms of wiper mechanisms for operating on the sides of the foreparts in one of which mechanisms means is provided for moving the wipers in unison heightwise of the last and for simultaneously moving them inwardly over the top of its forepart, while in the other wiper mechanism means is provided for actuating the wipers individually. In both of the illustrated lasting organizations the toe end of the moccasin bottom is shaped over the last by a lasting member, herein illustrated as a stranded wire or cable.

For exerting a tension or retarding action on the margin at the toe end of the moccasin bottom during the operation of the toe-lasting cable to shape the toe end of the moccasin bottom over its last the invention provides spreading means constructed and arranged to press the margin of the forepart of the moccasin bottom against the toe-lasting cable after said margin has been turned outwardly over the cable. Two different constructions of said spreading means are illustrated in the drawings. In one of said constructions the spreading means includes a flexible sheet member constructed and arranged to engage the outturned margin of the moccasin bottom, said sheet being illustrated as composed of vulcanized rubber. In the other construction the pressing means includes a corrugated plate constructed and arranged to press the outturned margin of the moccasin bottom against the toe-lasting member. In accordance with a further feature of the invention this spreader construction includes a plurality of resiliently yielding members illustrated as spring fingers for engaging the outturned margin of the moccasin bottom and further retarding its movement inwardly over the top of the forepart of the last.

For limiting the advancement of the toe-lasting cable there is provided, in accordance with a further feature of the invention, an abutment plate and means for causing the plate to register with a predetermined area at the top of the forepart of the last. The illustrated abutment plate has the general shape of the forward portion of the toe piece which is to be secured to the upstanding margin of the forepart of the moccasin bottom.

For holding the forepart of the moccasin bottom in lasted position I have illustrated herein two constructions in one of which the moccasin bottom is clamped against the last by an inflexible clamping member which, as shown in the drawings, is arranged to engage the forepart of the moccasin bottom along a line adjacent to the toe-lasting member after said member has reached the limit of its advance. In the other construction the moccasin bottom is held in lasted position by the toe-lasting member itself, a holddown being provided for maintaining clamping engagement of the lasting member with the margin of the forepart of the moccasin bottom. In accordance with a further feature of the invention, the holddown member engages means which operates to support the toe-embracing end of the lasting member, said supporting means being illustrated as a flexible member or band which connects the toe-embracing end of the lasting member to a series of resilient fingers, the holddown member being positioned between the lasting member and said resilient fingers.

The present invention also includes a novel method of making moccasins which, as disclosed herein, comprises shaping the forepart of a moccasin bottom over a last and while the moccasin bottom is held in lasted position in the lasting machine securing to the top of the forepart of the last a clamping member, herein illustrated as a metal block having the contour of the toe piece to be secured to the moccasin bottom, the margin of the bottom of said block being arranged to engage the excess margin of the forepart of the lasted moccasin bottom, thereafter trimming said excess margin from the moccasin bottom, removing the clamping block, positioning a toe piece on the top of the forepart of the last, and securing its edge face to the trimmed edge of the moccasin bottom. The trimming operation as herein illustrated is guided by the edge face of the clamping block, said edge face being beveled to provide a suitable gaging surface. If the trimming operation is to be performed before the moccasin bottom has set to the last, the upturned portion of the moccasin bottom is clamped to the periphery of the last before performing the trimming operation.

It is to be understood that it is not essential to my invention that all of the above steps be utilized nor that they be performed in the order outlined above, except to the extent that such is required by the claims.

These and other features and aspects of the invention will now be described with reference to the accompanying drawings and will be pointed out in the appended claims.

In the drawings,

Fig. 1 is a side elevation of a lasting machine embodying features of the present invention;

Fig. 2 is a detail view in side elevation illustrating the mechanism for operating the toe-lasting member in a position different from that illustrated in Fig. 1;

Fig. 3 is a plan view of the machine illustrated in Fig. 1;

Fig. 4 is a sectional elevation taken on the plane of the longitudinal median line of the last positioned in the machine;

Fig. 5 is a detail sectional elevation taken on the same plane as Fig. 4 and illustrating the toe-lasting mechanism in a position different from that illustrated in Fig. 4;

Fig. 8 is a sectional elevation taken substantially on the plane of the longitudinal median line of the supported shoe illustrating a different toe-lasting mechanism;

Fig. 9 is a detail sectional view taken on the same plane as Fig. 8 illustrating part of the toe-lasting mechanism in a position different from that illustrated in Fig. 8;

Fig. 10 is a detail view illustrating the moccasin clamping block and a portion of the member for pressing said block against the moccasin;

Fig. 11 is a sectional view taken substantially on the line XI—XI of Fig. 8;

Fig. 12 is a detail view of one of the side-lasting assemblies illustrated in Fig. 11 looking in the direction of the arrow at the right of Fig. 11;

Fig. 15 is a perspective view illustrating the operation of hand pincers on the moccasin bottom to stretch it heightwise of the last;

Fig. 16 is a perspective view of the forepart of a last having a lasted moccasin bottom secured thereto by the clamping block;

Fig. 17 is a perspective view of the forepart of a last having mounted thereon the peripheral clamping member for holding the upstanding margin of the forepart of the moccasin bottom during the trimming operation; and Fig. 18 is a perspective view of a lasted moccasin bottom having a toe piece cemented thereto and partially stitched thereto.

Figure 6:
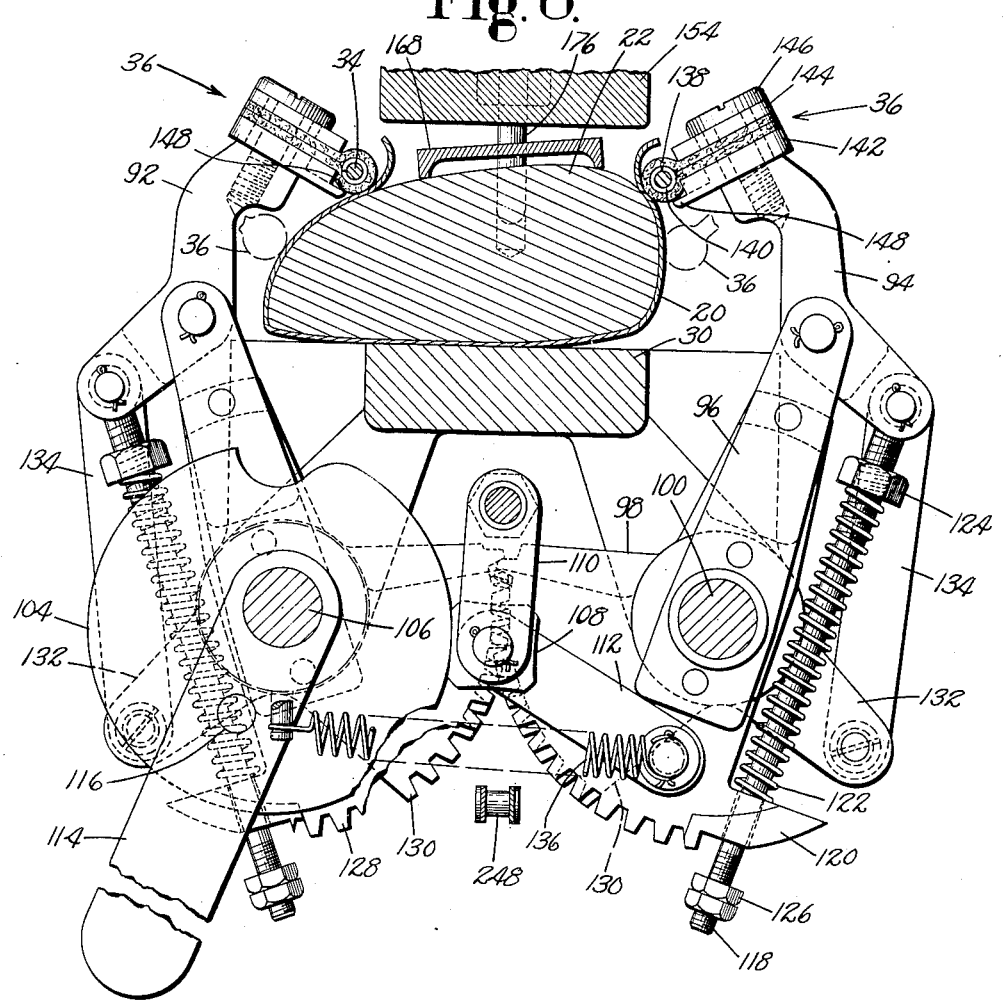
Fig. 6 is a sectional view taken substantially on the line VI—VI of Fig. 4.

The invention is illustrated in its application to the manufacture of moccasin shoes, such, for example, as the shoe illustrated in Figs. 1 and 18, which comprise a forepart member 20 which covers the bottom of the forepart of a last 22 and has its marginal portion arranged to extend upwardly about the periphery of the forepart of the last, and a rear part 24 having the general characteristics of a blucher quarter. The throat portion of the moccasin is positioned relatively to the last by tacks 26 driven through the hole of an eyelet in each of the blucher wings and into the last, the heel end of the shoe being positioned on the last by the usual assembling tack 28. The forepart of the shoe is loosely drawn over the last and tacked to the top of the forepart of the last before the shoe is positioned in the machine. The shoe is supported in the illustrated machine in an inclined, right-side-up position, the forepart resting on a bed plate 30 (Fig. 4) while the rear part is held by a clamp 32 which travels lengthwise of the supported shoe on the bed plate, thereby to position the forepart of the shoe relatively to the operating instrumentalities of the machine. Such forward movement of the shoe brings its forepart into engagement with a flexible lasting member herein illustrated as a wire or cable 34 which extends along both sides of the supported shoe and around its toe end (Fig. 15). The cable 34 is so adjusted as to its length that the advancing of the supported shoe into operative position tightens the cable around the forepart of the shoe, as illustrated in Fig. 1, thereby clamping the toe end of the forepart 20 to the last. For clamping the side portions of the forepart member 20 to the last, clamping members or wipers 36 are arranged at opposite sides of the shoe, said clamping members, as illustrated in Figs. 1 and 3, being provided with openings extending lengthwise of the shoe within which the cable 34 is slidably mounted. After the forepart 20 of the moccasin has been clamped against the last by the cable 34 and the wipers 36 the tacks which were driven through the forepart member 20 and into the top of the last to secure said member temporarily to the last are pulled and the forepart member is stretched heightwise of the last, for example, by means of hand pincers, the tension thus imparted to the forepart member being maintained by the cable 34 and the wipers 36. The margin of the forepart of the moccasin is then turned outwardly over the lasting cable 34 and a retarder or presser device 37 (Fig. 5) is brought into engagement with the outurned margin. The toe end of the shoe is wiped upwardly and gathered inwardly over the top of the forepart of the last by drawing the cable 34 rearwardly of the supported shoe while the retarder maintains a tension thereon in order to prevent the occurrence of wrinkles in the forepart member during the lasting operation and to insure the shaping of the forepart of the moccasin to the last. After the toe-lasting operation has been completed a pair of forepart clamping plates 38 are brought into engagement with the moccasin forepart member 20 directly beneath the cable 34, as illustrated in Fig. 4, said plates engaging the forepart member along a line substantially parallel to the line along which the forepart member is to be trimmed for the reception of a toe piece. After the clamping plates 38 have been brought into engagement with the shoe the forepart retarding devices are released and swung out of operative position and a clamping member or block 40 (Fig. 16) is secured to the last as hereinafter described in order to hold the forepart member 20 in lasted position while the shoe is pressed into the clamping member illustrated in Fig. 17, which member holds the shoe on the last while a toe piece is cemented to the forepart member 20. The clamping block 40, as illustrated in Fig. 16, is provided with a beveled edge face 42 which serves as a guide for a hand knife which is employed to trim off the excess margin of the forepart member, said edge face also serving to determine the angle of the trimming cut. Preferably the edge face of the toe piece is undercut to the same extent as the edge face of the forepart member 20. After the trimming operation the clamping plate 40 is removed from the last and the edge face of the toe piece is cement-attached to the edge face of the forepart member 20, said parts being permanently secured together either by a hand sewn seam or by a seam formed by a sewing machine such, for example, as the machine disclosed in United States Letters Patent No. 1,950,386, granted March 13, 1934, upon an application filed in my name.

Referring now to Figs. 1 and 4, the work-supporting means of the illustrated machine consists of the bed plate 30 which is supported at the upper end of a column 44 secured in a hollow machine frame 46, the bed plate 30 being provided with a downwardly-extending supporting flange 48 the bottom of which lies in a plane which forms an angle of approximately 30° to the top surface of the bed plate. The rear portion of the bed plate 30 is provided with a recess 50 for the reception of the heel clamp 32, the opposite side portions of the base of the heel clamp having tongue and groove connections to the side walls of said recess. For moving the heel clamp lengthwise of the supported shoe a screw 52 is positioned in the recess 50, each end of the screw being journaled in the bed plate 30, the rear end of the screw being provided with flanges 54 (Fig. 3) which engage opposite sides of a crossbar 55 at the heel end of the bed plate thereby preventing movement of the screw lengthwise of the supported shoe. As illustrated in Fig. 4, the screw 52 extends through a hole in the base of the clamp 32 about half the length of said hole being tapped for threaded engagement with the screw 52. The heel clamp 32 provides a rest for the heel portion of the last which is offset heightwise of the last from the plane of the bed plate 30 to the extent approximately of the height of a heel to be attached to the shoe. The heel portion of the shoe is centered widthwise thereof in the machine by side walls 56 (Fig. 3) of the heel clamp 32 which diverge forwardly of the supported shoe at an angle of approximately 90°. The top of the heel clamp 32 is arched over the top of the heel portion of the supported shoe and a clamping screw 58 is positioned heightwise of the supported shoe over the top of its heel end in a tapped hole in the top portion of the heel clamp. For limiting the movements of the supported shoe forwardly thereof by the operation of the screw 52 a bracket 60 is secured to the forward end of the bed plate 30 and arranged to be engaged by the toe end of the shoe thereby to position the shoe lengthwise relatively to the operating instrumentalities of the machine.

During its forward movement by the screw 52 the toe end of the supported shoe is brought into engagement with the flexible cable 34, said cable being drawn tightly about the toe end of the shoe during the latter part of its forward movement. Referring now to Figs. 1 and 3, the ends of the cable 34 extend through holes at opposite sides of a swinging head 62 near the top thereof and are secured to the rear face of said swinging head by a clamping screw 64. It will be seen that the effective length of the cable 34 may be varied by releasing the clamping screw 64 and either pulling up on the ends of the cable to shorten its effective length or, conversely, releasing additional cable to increase its effective length. Such adjustment of the cable 34 is required when changing from adult shoes to children's sizes or vice versa but ordinarily no adjustment of the cable would be required in operating on the usual run of adult sizes.

The swinging head 62 which carries the cable 34 is provided with downwardly-extending ears 66 (Fig. 1) which are journaled on a cross shaft 68 mounted in arms 70 extending rearwardly from the bed plate 30, said arms engaging the inner faces of the ears 66 and holding the swinging head 62 from movement widthwise of the shoe. For swinging the head 62 in a clockwise direction, as seen in Fig. 1, in order to draw the cable 34 in over the top of the forepart of the shoe, a pair of rotary cams 72 (Fig. 3) are secured to opposite ends of a cross shaft 74 journaled in the arms 70. The cams 72 engage cam followers 76 which are pivotally mounted in ears 78 projecting from opposite sides of the lower portion of the swinging head 62, said cam followers being positioned above the cross shaft 68 on which the head 62 is journaled. In order to afford a frictional engagement of the cam follower 76 with the cams 72 thereby to hold the swinging head 62 in any position to which it may be advanced by the cams 72, the cam followers 76, as illustrated in Fig. 2, are generally polygonal, their cam-engaging faces having a concave curvature of the same radius as the curvature of the cams 72. For simultaneously rotating the cams 72 in order to swing the head 62 in a clockwise direction, as seen in Fig. 1, a handle 80 is freely mounted on the cross shaft 74 near one end thereof. Upward movement of the handle 80 is transmitted to the cams by a pawl 82 mounted for rocking movement on the handle and arranged to engage a ratchet 84 secured to the cross shaft 74. In order that the operator shall not be required to disengage the pawl 82 from its ratchet before he can return the cams 72 to their initial positions, the pawl is held out of ratchet-engaging position when the handle 80 is at the limit of its downward movement, as seen in Fig. 1, by the engagement of a tail 86 formed on the pawl with one end of the cross shaft 68, the under surface of the tail 86 operating as a cam face against the cross shaft 68 to swing the pawl in a counterclockwise direction, as seen in Fig. 1, at the end of the downward or return movement of the handle 80. The end of the tail 86 is bent about the cross shaft 68 to provide a stop or hook for limiting the downward movement of the handle 80. The swinging head 62 is constantly urged in a counterclockwise direction, as seen in Fig. 1, by torsion springs 87 (Fig. 3) coiled about the shaft 68 and arranged to impart pressure to the swinging head forwardly of the supported shoe. After the completion of the lasting operation the cams 72 are returned to their initial position as seen in Fig. 1 in order to permit return movement of the swinging head. In the operation of the illustrated machine the cams 72 are returned to their initial position by downward movement of a handle 88 secured to the end of the cross shaft 74.

For wiping the side portions of the forepart of the shoe heightwise thereof toward the top of the forepart of the last a pair of side wipers 36 (Fig. 6) are secured to the upper ends of a pair of arms 92 and 94. The arm 94 is pivoted substantially midway of its length to the upper end of an arm 96, secured to a gear segment 98, journaled on a stud 100 extending from a boss provided in a downward extension 102 of the bed plate 30 (Fig. 4). For swinging the segment 98 in a counterclockwise direction, as seen in Fig. 6, a cam disk 104 is journaled eccentrically on a stud 106 projecting from a boss provided in the downward extension 102 of the bed plate. The cam disk 104 acts on a cam follower 108, the cam-engaging surfaces of which have a concave curvature of the same radius as the curvature of the eccentric 104. The cam follower is pivotally mounted at the lower end of a pendant 110, pivoted to the downward extension 102 of the bed plate (Fig. 4). The lateral movement imparted to the cam follower by the eccentric 104 is transmitted to the gear segment 98 by a link 112. For actuating the eccentric 104 a handle 114 is freely mounted on the stud 106 adjacent to the forward face of the eccentric 104 and is secured to the eccentric by a pin 116. The arrangement of the arm 96 on which the wiper arm 94 is pivoted is such that it moves the wiper arm both upwardly and laterally toward the side of the supported shoe thereby effecting the desired upward and inward wiping action of the wiper 36 against the moccasin forepart 20 on the last. For maintaining constant pressure of the wiper against the work a rod 118 is pivoted to the outer end of the arm 94 and arranged to extend downwardly therefrom through a hole provided in an ear 120 extending outwardly from the gear segments 98, a compression spring 122 being coiled about the stem 118 and confined between the top of the ear 120 and the bottom of a nut 124 near the upper end of the stem 118, said nut being adjustable endwise of the stem to vary the compression of the spring 122 in order to vary the pressure of the wiper 36 against the work. Stop nuts 126 at the lower end of the stem 118 serve to limit the movement of the stem upwardly through the hole in the gear segment 98 thereby determining the initial elevation of the side wiper 36. For operating the wiper arm 92 simultaneously with the wiper arm 94 a gear segment 128 is journaled on the stud 106 and arranged to mesh with the segment 98. The connections from the segment 128 to the wiper arm 92 will be understood from the description of corresponding connections from the gear segment 98 to the wiper arm 94. It has been learned that the wiper which operates on the inner side face of the moccasin forepart meets much more resistance to its operative movements than does the side wiper at the outer side portion of the shoe due to variation in inclination of the opposite sides of the forepart of the last. This difference in resistance to the operation of the side wipers is so great that the wiper which operates at the inner portion of the forepart of the moccasin tends to move the forepart of the shoe and the last bodily widthwise instead of performing its intended wiping operation. In order to overcome this condition and to insure a simultaneous and equivalent movement of the side wipers heightwise of the shoe, interengaging gear segments 130 are journaled on the studs 100 and 106, respectively, adjacent to the gear segments 98 and 128, respectively, each of said segments being provided with an arm 132 arranged substantially parallel to the outwardly-extending portion of the corresponding wiper-carrying arm, links 134 connecting the ends of the arms 132 to the outer ends of the wiper-carrying arms. It will be seen that the equal and opposite movement of the side wipers provided by the mechanism above described requires a widthwise movement of the forepart of the last to permit the wipers to follow the varying inclinations at opposite sides of the forepart of the last. The side wipers 36 are yieldingly held in their retracted position, as indicated by dash lines in Fig. 6, by a spring 136, one end of which is connected to the gear segment 98 and the other end of which is connected to the frame. Each of the side wipers 36, as illustrated in Figs. 3 and 6, is formed by folding a piece of flexible material, for example grain leather 138, over a flexible metal tube 140 and securing the adjacent surfaces of said leather member between a lower plate 142 and an upper plate 144, the entire assembly being secured to the upper end face of the wiper-carrying arm by a clamping screw 146. The lower plate 142, as illustrated in Fig. 6, is provided with a shoulder 148 which supports the work-engaging portion of the leather member 138 and prevents undue strain on the leather during the wiping operation. The opposite side portions of the lasting cable 34 extend freely through the flexible tubes 140 carried by the side wipers 92. Thus it will be seen that the side wipers 36 support the forepart of the lasting cable, determining the initial elevation thereof and also advancing the side portions of the lasting cable upwardly and inwardly over the top of the forepart of the last during the side-lasting operation.

In order for the illustrated lasting devices to shape the forepart of the moccasin to the last in a satisfactory manner, it is desirable that the upstanding margin of the forepart of the moccasin be held under substantial tension during the advance of the lasting instrumentalities. Referring now to Figs. 1, 3, 4, and 5, the illustrated means for holding the forepart of the moccasin under tension consists of gripper members or fingers 150 of which there are three in the illustrated assembly, one being located opposite the toe end of the supported shoe, while the other two are located at opposite sides of the toe portion of the shoe slightly forwardly from the region of the tip line. The fingers 150 are pivotally mounted in the margin of a plate 152, secured to a block 154, said block having secured to the bottom of its margin a plate 156 (Fig. 5), the edge face of which is arranged opposite the lower ends of the fingers 150 and provides an abutment against which said fingers press the upstanding margin of the upper. Each of the fingers 150 has pivoted thereto the small end of a headed pin 158, said pin extending inwardly into a recess provided between the plate 152 and the block 154. The pins 158 each carry a compression spring 160 which is confined between the head at the free end of the pin and brackets 162 extending downwardly from the plate 152 adjacent to the pin. The pins 158 are so arranged relatively to their fingers 150 that they cross the axes on which the fingers swing during the movement of the fingers to and from upper-engaging position and therefore operate to hold the fingers alternatively in open or closed position. In order to increase the tension on the upper during the overwiping movement of the lasting cable 34, the bottom plate 156 is provided with a series of corrugations extending lengthwise of said plate, said corrugations having edges which engage the flesh surface of the margin of the moccasin forepart to resist the movement of said margin across the bottom of said plate. The margin of the forepart of the moccasin is pressed between the lasting cable 34 and the corrugated surface of the plate 156, as illustrated in Fig. 5, by a compression spring 164 coiled about a rod 166 which carries the block 154 and the parts mounted thereon. Near its lower end the rod 166 carries an abutment plate 168 provided with a flanged margin which defines substantially the periphery of the forward end of a toe piece to be secured to the upstanding margin of the forepart of the moccasin. The abutment plate 168 is positioned between collars 170 formed on or secured to the shaft 166 and spaced apart somewhat more than the thickness of the plate 168 in order to permit sufficient freedom of movement of the said plate for it to adjust itself to the top of the forepart of the last. The plate 168 is positioned lengthwise and widthwise of the last by the engagement of the lower end of the rod 166 in a socket 172 extending downwardly from the top of the forepart of the last, said plate being oriented relatively to the toe end of the last by its engagement within a recess 174 (Fig. 4) provided in the under surface of the block 154 and corresponding in shape to the plate 168, the block 154 being oriented relatively to the toe end of the last by the engagement of a dowel 176 extending downwardly from a rearward extension of said block into a socket 178 in the top of the last. The abutment plate 168 is normally seated in the recess 174 in the block 154 by the spring 164 (Fig. 5), but becomes separated therefrom during the overwiping movement of the lasting cable 34 whereby the block 154 is lifted above the abutment plate as illustrated in Fig. 4. In order to permit sufficient freedom of movement of the block 154 during the advance of the lasting cable 34 to prevent binding of the block 154 on the rod 166, the opening 180 in the block 154 through which the rod 166 passes is substantially greater in diameter than the rod.

Figure 7:
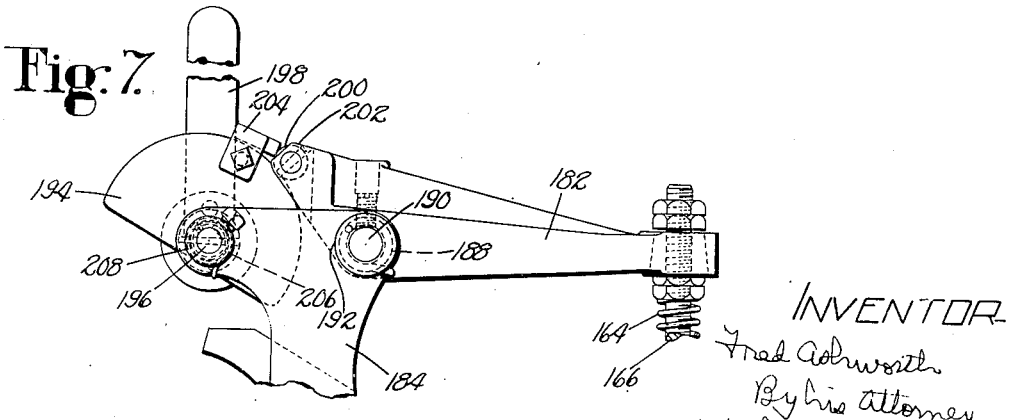
Fig. 7 is a detail view in elevation of mechanism for clamping the spreader assembly against the top of the last.

Referring now to Figs. 1, 3, and 7, the rod 166 and parts carried thereby are suspended from an arm 182, one end of which is pivotally mounted between upwardly-extending parallel arms 184 of a bracket 186 which extends forwardly and then upwardly from the bed plate 30. The arm 182 is yieldingly held at the limit of its upward movement by a torsion spring 188 which is coiled about an extension of the pivot pin 190 to which the arm 182 is secured, one end of said spring being secured to the pivot pin by a collar 192 while the opposite end of the spring is arranged to engage the bracket 186. The arm 182 is swung downwardly by hand in order to bring the parts mounted thereon into engagement with the last, in which position the arm 182 is locked by the operation of a rotary cam 194 which is pivotally mounted between the outer ends of the arms 184. The cam 194 is secured to a cross shaft 196 which is provided with a handle 198. The cam 194 engages a roll 200 (Fig. 7) carried by an extension 202 of the arm 182, downward movement of the arm 182 by the cam being limited by the engagement of a stop member 204 secured to the margin of the cam with the periphery of the roll 200, said stop member being yieldingly held against the roll by a torsion spring 206, coiled about the cross shaft 196, and having one end secured to the shaft by a collar 208, the opposite end being bent to engage the under surface of one of the arms 184.

For clamping the forepart of the moccasin to the last after the completion of the lasting operation, the forepart-embracing clamping plates 38 (Fig. 3) are arranged to engage the lasted forepart member 20 beneath and adjacent to the lasting cable 34. The plates 38 are pivoted together at a point in line with the longitudinal median line of the supported shoe and adjacent to the clamping edges of the plates. As illustrated in Fig. 4, the clamping plates are supported on a carrier 212 and are held from upward movement by a plate 214 formed integrally with the carrier and arranged to overlie portions of the clamping plates. The carrier 212 terminates in a plunger 216 which is slidably mounted in a guideway in a swinging head 218. The plunger 216 is yieldingly urged toward the toe of the supported shoe by a compression spring 220 coiled about a stem 222 extending from the plunger 216, movement of the plunger by the spring 220 being limited by a stop nut 224 mounted on the portion of the stem 222 projecting from the swinging head 218. The clamping plates 38, as illustrated in Fig. 3, are provided with open-ended arcuate slots 226, the axes of curvature of which coincide with the pivot point of said plates, the open ends of said slots being located at the inner edge faces of the clamping plates between the pivot point of said plates and the swinging head 218. For operatively connecting the plates 38 to the carrier 212 rolls 228 are mounted in the carrier 212 in the opening between the bottom plate and the top plate 214 thereof, said rolls being pivotally mounted at opposite sides of the longitudinal median line of the supported shoe and substantially equally distanced therefrom for engagement within the slots 226 provided in the clamping plates. The illustrated construction permits the clamping plates 38 to be advanced by movement of the swinging head 218 lengthwise of the supported shoe while permitting the clamping plates to close upon the supported shoe as they are brought into engagement therewith. In order to insure sufficient clamping pressure of the plates 38 against the sides of the toe portion of the shoe, a crossbar 230 (Fig. 3) is pivotally mounted midway of its length on the top of the swinging head 218 and is connected to the outer margins of the clamping plates 38 by links 232 pivoted to the ends of the crossbar and also to removable thumb screws 234 projecting upwardly from the clamping plates. The illustrated construction permits the removal of the clamping plates 38 by merely disengaging the thumb screws 234 from the clamping plates and swinging the plates toward each other until they disengage the rolls 228 in the carrier 212.

For supporting the swinging head 218 trunnions 236 are arranged to extend outwardly therefrom for pivotal engagement with a carriage 238 (Fig. 4) which is slidably mounted in a crosshead 240 for movement substantially heightwise of the supported shoe. The crosshead 240 is slidably mounted on hollow shafts 242 (Fig. 3) secured to the machine frame beneath the toe end of the supported shoe and at opposite sides thereof, said shafts extending in parallel relation to each other forwardly of the supported shoe. As herein illustrated the hollow shafts 242 are extensions of the shafts 100 and 106 on which the side wiper operating parts are journaled. The hollow shafts 242 are arranged for engagement within suitable holes provided in barrels 244 at opposite sides of the crosshead 240. For advancing the crosshead 240 toward the toe end of the supported shoe a treadle 246 (Fig. 1) is pivoted to the base of the machine frame and connected to the crosshead by a chain 248 which extends upwardly through the interior of the frame and through the hollow base portion of the bed plate 30 where it passes over a sprocket 250 and extends therefrom forwardly of the supported shoe to a hook 252 secured to the crosshead. The crosshead is moved away from the toe end of the supported shoe in order to disengage the clamping plates 38 therefrom by compression springs 254 (Fig. 3) contained within the hollow shafts 242 and arranged to engage a crossbar 256 secured to the crosshead 240 and having its ends positioned opposite the ends of the hollow shafts 242, the crossbar 256 being provided with studs 258 projecting from its ends into the springs 254. Suitable slots 260 (Fig. 4) are provided in the hollow shafts 242 to give the necessary clearance for the crossbar 256 as it moves toward the supported shoe with the crosshead 240. The clamping plates 38 may be adjusted heightwise of the supported shoe by turning a hand screw 262 which projects upwardly into the hole in the crosshead 240 in which the carriage 238 is slidably mounted and has threaded engagement within a tapped hole 264 extending upwardly from the base of the carriage. A compression spring 266 coiled about the hand screw 262 and confined between the base of the carriage 238 and the bottom plate 268 of the crosshead 240 holds the head of the hand screw in engagement with the bottom plate 268 and yieldingly supports the carriage 238. In order to facilitate the removal of the shoe from the machine after the completion of the operations thereon, means is provided for moving the clamping plates 38 away from the top of the supported shoe. As herein illustrated, said means consists of a tension spring 270, one end of which is connected to the bottom of that end of the swinging head 218 farthest from the supported shoe, the opposite end of said spring engaging a pin 272 at the lower end of the crosshead 240. The clamping plates 38 are held in position to operate on the supported shoe by a latch member 274 illustrated in Fig. 4, said member being constructed and arranged to seat in a socket extending upwardly into the bottom of the swinging head 218, said latch member being illustrated as a stem extending freely through a hole in the hand screw 262 and provided at its upper end with a collar 276 which is backed up by a compression spring 278 which is seated at the base of a counterbore extending downwardly from the top of the carriage 238. The stem of the latch member extends downwardly from the head of the hand screw 262 and is provided with a spherical head to facilitate downward movement of the stem to disengage the latch member from the swinging head 218. In order to prevent injury to the toe end of the shoe by the pressure of the clamping plates 38, a stop member or block 280 is secured by a clamping screw 282 to the bottom of the carrier 212 and arranged to engage the bracket 60.

After the clamping plates 38 have been brought into clamping engagement with the toe end of the shoe the rod 166 and the parts mounted thereon are swung away from the supported shoe whereupon the operator wipes the excess margin at the toe end of the forepart member 20 in over the top of the last with his fingers. The clamping member or block 40 (Fig. 16) is then placed on the margin of the forepart member adjacent to the clamping plates 38, the opening extending through the top of the block being arranged in line with an internally threaded block extending downwardly into the toe end of the last whereupon the clamping block 40 is secured to the last by a clamping screw 288. After the clamping block has been secured to the shoe, the shoe is removed from the machine and a clamping member 290 (Fig. 17) is brought into engagement with the forepart of the shoe and secured in position by forcing into the last bottom a screw-actuated pin 292 carried by an internally-threaded boss 294 extended downwardly from the bottom of a T-shaped base member 296. The clamping member 290 comprises a resilient plate 298 which is bent to conform to the peripheral curvature of the forepart of the last and also has its top margin curved inwardly sufficiently to engage the margin of the forepart of the last. The plate 298 is provided at its toe end with a downwardly and rearwardly extending ear 300 and is provided at its rear ends with similar ears 302 extending downwardly and inwardly toward each other, the ear 300 being secured by a clamping screw 304 to the base plate 296 at the bottom of the T while the ears 302 are secured by clamping screws 306 to the base plate 296 at opposite sides of the crossbar of the T, slots 308 being provided in the ears 302 to permit adjustment of the sides of the resilient plate 298 widthwise of the shoe. The plate 298 is pressed downwardly against the margin of the top of the shoe by a presser plate 310 secured to the base plate 296 and arranged to press against the bottom of the shoe. The presser plate 310 as herein illustrated is positioned between the base plate 296 and the bottom of the shoe, the margin of the presser plate adjacent to the toe end of the shoe being bent around the base plate 296 and secured thereto by the screw 304. A presser member 312 is stamped out of the portion of the plate 310 which underlies the toe end of the shoe and is bent upwardly to engage the bottom of the shoe, a corresponding presser member 314 being provided at the opposite end of the plate 310 while the opposite side portions 316 of said plate are bent upwardly to engage the shoe bottom.

The preferred operation of the machine illustrated in Fig. 1 is as follows. The last 22 and the moccasin parts thereon having been secured in the heel clamp 32, the screw 52 is operated to bring the shoe into operative position whereupon the side wipers 36 are advanced and the lasting cable 34 is pulled up tightly to the toe end of the last if it was not tightened by the advancement of the shoe into operative position. The margin of the forepart member 20 is then stretched heightwise of the last by means of hand pincers, the tension thus imparted to the stock being maintained by the side wipers 36. During the operation of the hand pincers the last is held down on its support by the side wipers. The rod 166 and the parts carried thereby are then swung into engagement with the top of the forepart of the last and clamped in said position by swinging the cam 194 into the position illustrated in Fig.

7. The fingers 150 are then brought into engagement with the upstanding margin of the forepart member 20 whereupon the lasting cable 34 is advanced to gather the upstanding margin of the forepart member 20 inwardly over the top of the forepart of the last. The clamping plates 38 are then advanced to clamp the forepart member 20 against the last and to hold said member in lasted position until the clamping block 40 is secured thereto. The fingers 150 are then disengaged from the forepart member 20 and the rod 166 and the parts mounted thereon are then swung upwardly away from the last. The clamping block 40 is then secured to the top of the last, whereupon the shoe is removed from the machine and the clamping member 290 is secured to the forepart of the shoe. The forepart member 20 is then trimmed, the beveled edge face 42 of the block 40 serving as a gage for the trimming operation. The block 40 is then removed and the toe-piece 318 (Fig. 18) is secured by cement to the margin of the forepart member 20, preferably with the edge face of the toe-piece abutting the edge face of the forepart member. The parts are thereafter permanently secured together by a two-thread seam.

Figure 13:
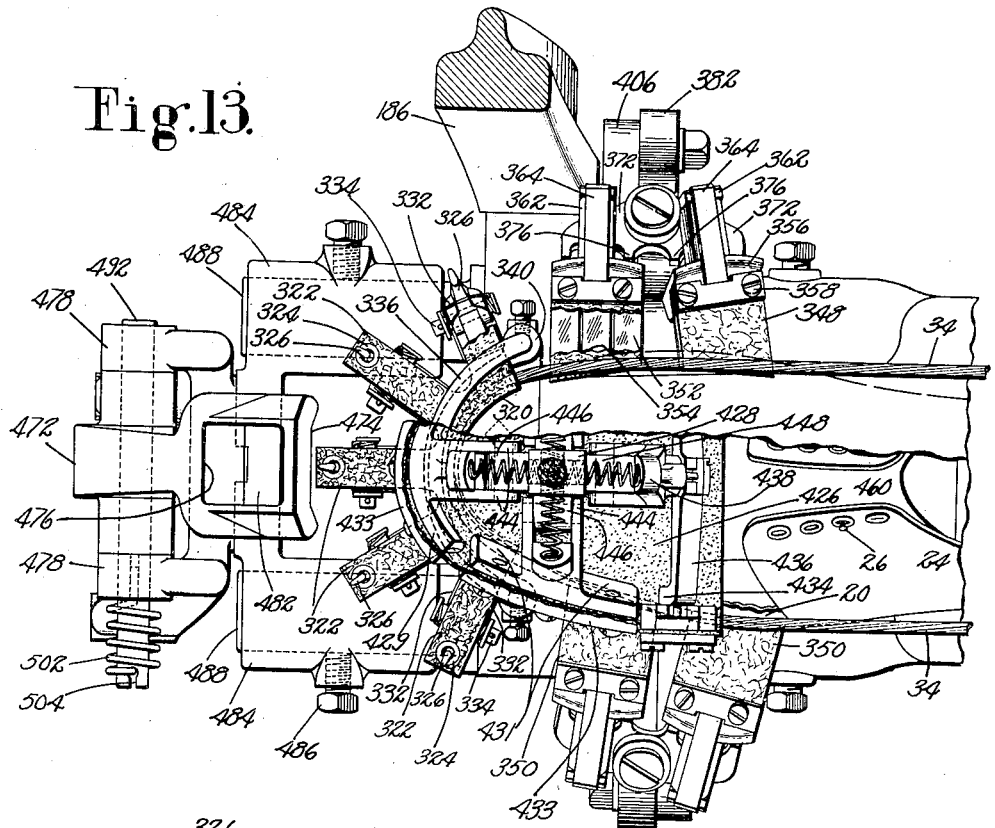
Fig. 13 is a plan view of the lasting mechanism illustrated in Fig. 8.
Figure 14:
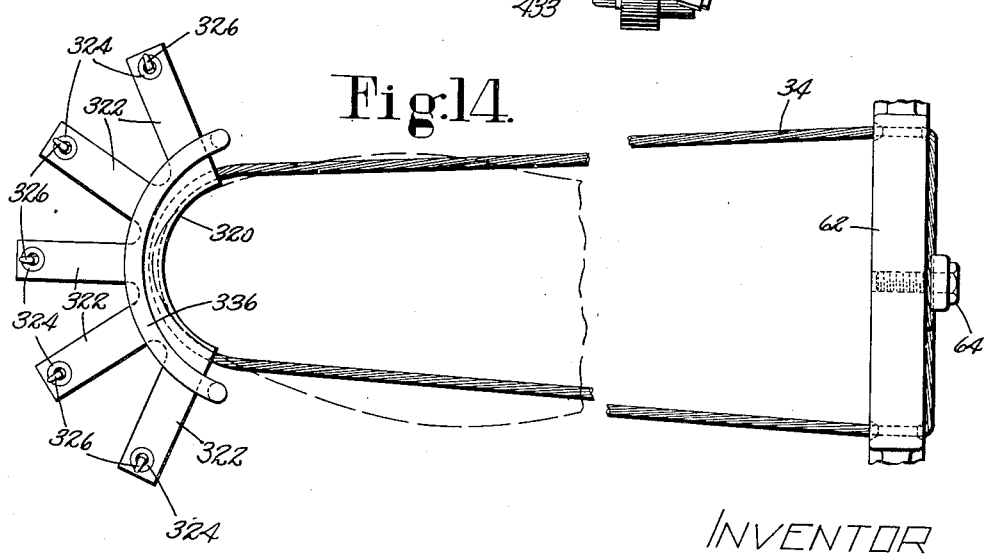
Fig. 14 is a plan view illustrating the toe-lasting member of Fig. 8 and parts associated therewith.

The features of the alternative construction illustrated in Figs. 8 to 15, inclusive, which differ from the construction shown in Figs. 1 to 7, will now be specifically described. Referring to Fig. 14, the lasting cable 34 is provided at its toe end with a flexible member 320 which is folded over the lasting cable and arranged to extend forwardly and outwardly of the shoe therefrom, said member being formed to provide a series of links 322 extending divergently from the lasting cable, each of said links comprising a top thickness and a bottom thickness of the member 320, the two thicknesses of material being secured together at the ends of the links 322 by eyelets 324. If it is desired to provide for convenient replacement of the member 320 the two thicknesses of the links 322 are left separate, an eyelet being provided in each thickness. Engaging the links 322 within the eyelets 324 are a series of upstanding fingers 326 (Fig. 15) which are pivotally mounted on extensions 328 (Fig. 8) of a bracket 330 secured to the bed plate of the machine, said fingers 326 being arranged to swing independently in the direction of their respective links 322. For swinging the fingers 326 away from the supported shoe, said fingers are provided with torsion springs 332, said springs being coiled about the pins 334 on which the fingers are pivoted, the main portions of said springs being arranged to engage the surfaces of said fingers which face the supported shoe while the ends of said springs are bent to engage the top faces of the extensions 328. When there is no shoe in the machine the fingers 326 hold the lasting cable 34 in the position illustrated in Fig. 14 wherein the cable is drawn forwardly and outwardly into a position determined by the engagement of that portion of the flexible member 320 which embraces the lasting cable 34 with a holddown member or bar 336 positioned above the flexible member, the bottom of the member 320 engaging the top of the bracket 330, (Fig. 8) which is positioned below the member 320. The space between the holddown bar and the bracket is sufficient to permit movement of the links 322 therebetween but not sufficient to permit the lasting cable to pass between them. The holddown bar 336 and the bracket 330 are in alinement with each other heightwise of the shoe and have the general curvature of the toe end of the shoe and consequently the lasting cable 34 in its rest position as seen in Fig. 14 has the general curvature of the toe end of the shoe, while the side portions of the cable are spaced from each other somewhat less than the width of the forepart of the shoe. The holddown bar 336 as herein illustrated is secured to the bracket 330, the opposite end portions 338 (Fig. 15) of the holddown bar being turned downwardly and seated in suitable sockets provided in bosses 340 formed at opposite sides of the bracket 330. In order to permit adjustment of the bracket 330 and the parts mounted thereon heightwise of the supported shoe, said bracket is secured to the bed plate 30 by angle brackets 342 (Fig. 8), the downwardly-extending portions of which are provided with slots 344 extending heightwise of the supported shoe, clamping screws 346 extending through said slots and into the bed plate 30.

The alternative side-wiping assembly illustrated in Figs. 11, 12, and 13 comprises a pair of wiper plates 348 arranged to operate on the right side of the shoe in the machine and a corresponding pair of wiper plates 350 arranged to operate on the left side of the shoe. Each of the illustrated side wipers consists of a flexible, resilient plate 352 which, as illustrated in Fig. 13, is divided widthwise thereof into three sections in order to increase its flexibility. The plates 352 are each covered with flexible non-abrasive material, for example a piece of thin grain leather 354, which, as illustrated in Fig. 11, is folded over the wiping edge of the wiper plate and secured together with the plate to a block 356 by clamping screws 358. The blocks 356 each terminate in a pin 360 which is freely mounted in a hole provided in a swivel block 362 and is held in position therein, as illustrated in Fig. 11, by a spring clip 364 secured by the clamping screw 358 to the top of the wiper plate, said clip extending upwardly from the wiper plate, then lengthwise of the pin 360 over the top of the swivel block 362, the free end of said clip being bent downwardly for engagement with a beveled face 366 formed in the swivel block at the upper extremity of its outer end face. Each of the clips 364 holds its swivel block 362 in the position illustrated in Fig. 11 wherein a shoulder 368 formed on each block engages the inner face of the swivel block 362, said clip also serving yieldingly to hold the wiper plates inclined upwardly a few degrees from the horizontal for engagement with the side portions of the supported shoe. Each swivel block 362 is provided with a downwardly-extending pivot pin 370 which is freely mounted on one side of a carrier member or plate 372 and held from heightwise movement thereon by a headed screw 374 secured to the end of the pivot pin 370, the head of said screw extending beyond the end of said pin for engagement with the bottom of the plate 372. As illustrated in Fig. 12, there is one carrier plate 372 for each pair of wipers. In order to maintain a proper orientation of the side wipers relatively to the supported shoe while still permitting sufficient movement of the wipers individually about the axis of their pivot pins 370 to afford self-adjustment of the wipers to the contour of the shoe, the carrier plate 372 is provided with stops 376 (Fig. 13) arranged opposite downwardly-extending portions 378 (Fig. 11) of the blocks 366, four such stops being provided in each of the plates 372 as illustrated in Fig. 13, one of said stops being arranged adjacent to each side of each of the two side wipers carried thereby. Each of the carrier plates 372 is pivotally mounted on a stud 380 (Fig. 11) extending upwardly from an arm 382. The illustrated side wipers are operated individually rather than in unison as are the side wipers illustrated in Fig. 6. The wipers are operated by hand levers 384, corresponding connections being provided between each set of wipers and its operating hand lever. For convenience of description, only the connections for operating the pair of wipers at the right of Fig. 11 will be described in detail, it being understood that the wipers at the opposite side of the shoe are operated by corresponding parts. The illustrated operating connections for the wipers above referred to consist of a discoidal rotary cam 386 journaled eccentrically on a stud 388 secured to the machine frame and arranged to extend lengthwise of the supported shoe. The cam disk 386 engages a rounded face 390 at the lower end of a pendant 392 pivotally mounted on a pin 394, which is best illustrated in Fig. 8, and is threaded at one end thereof to the machine frame and supported at the opposite end in a strap 396 extending between opposite side portions of the frame. Pivotally mounted at the bottom end of the pendant 392 is a link 398, the opposite end of said link being pivoted to an ear 400 extended downwardly from an arm 402 journaled on a stud 404 corresponding to the stud 388. The swinging movement imparted to the arm 402 by the cam 386 imparts counterclockwise movement to a bell crank lever 406 journaled on the stud 404 adjacent to the arm 402, the end of the vertical arm of the bell crank lever having pivoted thereto one end of the arm 382 on which the side-wiper assembly is supported, while the end of the horizontal arm of said lever is secured to the outer end of the arm 402 by a clamping screw 408, extending through an arcuate slot 410 in the arm 402, thus affording relative adjustment of the bell crank lever 406 and of the arm 402 within the range of said slot in order to vary the position of the side-wiper assembly widthwise of the supported shoe. The wipers are yieldingly urged downwardly against the supported shoe by a compression spring 412 coiled about a rod 414 pivoted to the outer end of the arm 382, the lower end of said rod extending through an opening in a boss 416, provided in an arm extending downwardly from the bell crank lever 406, downward movement of the side wipers by the expansion of said spring being limited by stop nuts 420 arranged on the threaded end of the rod 414 for engagement with the bottom of the boss 416. For yieldingly holding the wiper assemblies at the limit of their movement away from the sides of the supported shoe, the downwardly-extending arms of the wiper-actuating bell crank levers at opposite sides of the machine are connected by a tension spring 422, the retraction of the wiper 350 by the spring 422 being limited by the engagement of a stop screw 424 carried by the arm 402 with the bottom of the bed plate 30 while a corresponding stop screw 425 limits the retraction of the wiper 349.

In the illustrated alternative construction the forepart of the moccasin is held under tension during the advance of the lasting cable 34 by a member constructed and arranged to engage the outspread margin of the forepart of the moccasin and press it downwardly against the member 320 which covers the lasting cable. As illustrated in Figs. 8 and 11, the upper-engaging member consists of a piece of flexible and preferably resilient sheet material 426, such as vulcanized rubber, the central portion of which is secured to a block 428 and the upturned margin of which is clamped to arms 429 (Fig. 13) extending in opposite directions from the end of the horizontal arm of a bell crank lever 430 which, in its operative position, is arranged adjacent to the toe end of the shoe. Each side portion of the margin of the member 426 is clamped to arms 431 extending in opposite directions from the end of the horizontal arm of a bell crank lever 432, clamping plates 433 being provided for clamping the member 426 to the arms 429 and 431, respectively. The arms 429 and 431, as illustrated in Fig. 13, are arranged substantially in alinement with the periphery of the toe end of the last. That portion of the sheet member 426 which engages the rearward extremity of the forepart of the moccasin has downward pressure imparted thereto by presser feet 434 (Fig. 8) formed at the ends of a crossbar 436 extending widthwise of the supported shoe, said crossbar being secured to a right angular lever 438 and held from turning movement thereon by a dowel 440 projecting outwardly from the lever 438 into a notch provided in an upwardly-extending boss 442 on the crossbar 436. The bell crank levers 430 and 432 and the lever 438 are pivotally mounted on the block 428, each of said bell crank levers being provided with a pair of ears 444 (Fig. 13) arranged to engage opposite sides of arms 446 extending outwardly from the block 428, while the horizontal portion of the lever 438, as illustrated in Fig. 13, is divided into two parallel arms which engage opposite sides of an arm 448 extending rearwardly from the block 428. The bell crank lever 430 and the right angular lever 438 are urged downwardly in order to press the sheet member 426 against the outturned margin of the moccasin forepart by a compression spring 450 supported in an upwardly-extending portion 452 of the block 428 and having its ends seated in sockets provided in the levers 430 and 438, respectively. Similarly, the bell crank levers 432, as illustrated in Fig. 11, are urged downwardly by a compression spring 454 carried by the upwardly-extending portion of the block 428 and having its ends seated in sockets provided in the levers 432, respectively. For limiting the advancement of the lasting cable 34 an abutment member 456, similar to the abutment member 168 illustrated in Fig. 4, is secured to the bottom of the block 428 by screws 458. The member 456 also serves to clamp the central portion of the sheet member 426 against the bottom of the block 428. The block 428 and the parts mounted thereon are located in a predetermined position on top of the forepart of the illustrated last 460 by locating pins 462 extending downwardly from the block 428 for engagement within suitable sockets provided in the top of the forepart of the last, said pins extending through openings in the sheet member 426 and the abutment member 456, the rear pin being an extension of one of the screws 458 (Fig. 8). The block 428 and the parts mounted thereon are suspended from the free end of an arm 464 which corresponds to the arm 182, illustrated in Fig. 3. The threaded top portion 466 of the upwardly-extending member 452 of the block 428 extends through a slot in the end of the arm 464. The block 428 and the parts mounted thereon are located heightwise relatively to the arm 464 by adjustable nuts 468 arranged to engage opposite faces of the arm 464. The block 428 and the parts carried thereby are held against the top of the forepart of the last 460 by manually-actuated devices corresponding to the organization illustrated in Fig. 7. It will be seen that the block 428 does not move heightwise of the supported shoe during the advancement of the lasting cable 34 and consequently the lasting cable, as it moves upwardly and inwardly over the top of the forepart of the last with the margin of the forepart of the moccasin, bends the sheet member 426 upwardly away from the last, thereby increasing the tension of said member against the outspread margin of the upper. In order to provide sufficient clearance for the advancing of the lasting cable, together with the member mounted thereon and the outturned margin of the upper, the under surfaces of the bell crank levers 430 and 432, respectively, are recessed as indicated at 470 in Figs. 8 and 11.

The toe-embracing clamping plates 38 illustrated in Fig. 4 are omitted from the construction illustrated in Fig. 8 because the holddown bar 336 provided by that construction holds the lasting cable 34 in clamping engagement with the forepart of the moccasin and thus obviates the requirement of any further means for holding the moccasin in lasted position after the moccasin-engaging sheet member 426 has been lifted away from the supported shoe.

The clamping block 40, illustrated in Fig. 16, may be employed in connection with the construction illustrated in Fig. 8, which includes a cam-pressed lever 472 one end of which is arranged to be brought into engagement with the clamping block 40 after it has been positioned on the last and to press the block against the margin of the forepart of the moccasin on the last and to hold it in position for the reception of the clamping screw 288 whereby the block is secured to the last. As illustrated in Fig. 10, the end of the lever 472 which engages the clamping block is provided with a recess 474 within which the top of the clamping block is received, the recessed portion of the lever being provided with an opening 476 (Fig. 13) through which the clamping screw 288 may be passed in clamping the block to the last. The lever 472 is pivoted midway between its ends to the upper ends of an H-shaped bracket 478 which is secured by a clamping screw 480 passing through a suitable hole in its crossbar into the central portion of a crosshead 482, the barrel-shaped side portions 484 of said crosshead being adjustably secured by clamping screws 486 to parallel shafts 488 extending generally lengthwise of the supported shoe. For imparting pressure to the lever 472 after it has been swung manually into position to engage the clamping block 40 a rotary cam member 490 is secured to a cross shaft 492 which is journaled in the lower ends of the H-shaped bracket 478. A cam roll 494 is pivoted to the lower end of the lever 472, said end portion of the lever being bent to position the roll for engagement by the cam 490 after the lever has been swung to operative position, as indicated by broken lines in Fig. 8. The cam 490 may be operated by a handle 496 secured to one end of the cross shaft 492 or it may be operated by a treadle (not shown) pivotally mounted in the base of the machine and connected to one end of a chain 498 extending upwardly through the interior of the machine frame, over a sprocket (not shown), then over a sprocket 500 secured to the cross shaft 492. The end link of the chain is attached to the sprocket 500. For yieldingly holding the cam 490 at the limit of its movement in a counterclockwise direction, as seen in Fig. 8, a torsion spring 502 (Fig. 13) is coiled about an extension of the cross shaft 492, one end of said spring being mounted in the bracket 478 while the other end is positioned in a slot 504 in the end of said shaft.

In the operation of the construction illustrated in Fig. 8 the shoe is positioned in the machine by bringing its toe end into clamping engagement with the covered portion of the lasting cable 34 which, in turn, is positioned by its engagement with the holddown bar 336 and the bracket 330 which limit movement of the lasting cable lengthwise of the supported shoe. After the shoe is positioned in the machine the lasting cable 34 is pulled up slightly and the side wipers 348 and 350 are advanced to the limit of their overwiping movement, as illustrated in Fig. 13. The forepart of the moccasin is then stretched heightwise thereof, for example by means of hand pincers 506 (Fig. 15). The margin of the forepart member 20 projecting above the lasting cable 34 is then turned outwardly upon the lasting cable whereupon the upper-engaging member 426 is brought into engagement with the outturned margin of the upper and the clamping mechanism illustrated in Fig. 7 is operated to secure the upper-engaging member in operative position, as illustrated in Fig. 8. The lasting cable 34 is then advanced from its position illustrated in Fig. 8 to its position illustrated in Fig. 9, the upper-engaging member 426 being bent upwardly and stretched somewhat by movement of the lasting cable between it and the last. The frictional engagement of the member 426 with the outturned margin of the forepart member 20 during the advance of the lasting cable 34 offers sufficient resistance to the movement of said outturned margin to cause tension to be imparted to the upper during the advancement of the lasting cable, such tension being sufficient to prevent the occurrence of wrinkles in the margin of the forepart member 20 as it is gathered in over the top of the forepart of the last. After the lasting cable has been advanced to its position illustrated in Fig. 9 the member 426 and the parts associated therewith are swung upwardly away from the last, the lasting cable 34 serving to hold the forepart member 20 in lasted position. The margin of the upper is then turned inwardly over the top of the last and the clamping block 40 is positioned on the top of the last with its bottom margin engaging the inturned margin of the forepart member. The lever 472 is then pressed against the clamping block whereupon the clamping block is secured to the last by the clamping screw 288 (Fig. 10). The remaining operations on the shoe are the same as described above in connection with the operation of the machine illustrated in Fig. 1.

Having thus described my invention, what I claim as new and desire to secure by Letters Patent of the United States is:

1. In a machine for shaping moccasins over lasts, means for lasting the toe end of a moccasin bottom, wipers constructed and arranged to operate locally on the sides of the forepart of the moccasin bottom, and means for effecting relative movement of the wipers and the last heightwise of the last in a direction to work the material of the moccasin bottom toward the top of the forepart of the last.

2. In a machine for shaping moccasins over lasts means for working the toe end of a moccasin bottom heightwise thereof toward the top of the forepart of a last, and wipers constructed and arranged to operate locally on the sides of the forepart of the moccasin bottom beginning at an elevation substantially above the last bottom and extending upwardly and inwardly over the top of the forepart of the last.

3. In a machine for shaping moccasins over lasts, means for working the toe end of a moccasin bottom heightwise thereof and inwardly over the top of a forepart of a last, wipers constructed and arranged to operate locally on the sides of the forepart of the moccasin bottom, means for moving said wipers heightwise of the last and simultaneously inwardly over the top of the forepart of the last, and means for maintaining constant pressure of the wipers against the moccasin bottom.

4. In a machine for shaping moccasins over lasts, means for lasting the toe end of a moccasin bottom, wipers constructed and arranged to operate locally on opposite sides of the forepart of the moccasin bottom, and means for moving the wipers in unison heightwise of the last and simultaneously inwardly over the top of the forepart of the last.

5. In a machine for shaping moccasins over lasts, means for lasting the toe end of a moccasin bottom, wipers constructed and arranged to operate locally on opposite sides of the forepart of the moccasin bottom, and means for moving the wipers individually heightwise of the last and simultaneously inwardly over the top of its forepart.

6. In a machine for shaping moccasins over lasts, a toe-lasting wire and side-lasting members constructed and arranged to carry the lasting wire heightwise of the last and inwardly over the top of its forepart.

7. In a machine for shaping moccasins over lasts, a toe-lasting cable and side-lasting members constructed and arranged to carry the lasting cable heightwise of the last and inwardly over the top of its forepart, while permitting movement of the lasting cable lengthwise of the last relatively to the wipers.

8. In a machine for shaping moccasins over lasts, means for lasting the toe end of a moccasin bottom, a wiper constructed and arranged to operate locally on one side of the forepart of the moccasin bottom, an arm to which the wiper is secured, said arm being mounted to swing about an axis extending generally lengthwise of the last, means for moving said arm bodily heightwise of the last toward the top of the last, and for simultaneously swinging the arm about its axis thereby to move the wiper inwardly over the top of the last.

9. In a machine for shaping moccasins over lasts, means for lasting the toe end of a moccasin bottom, and a pair of wipers constructed and arranged to operate locally on opposite sides of the forepart of a moccasin bottom, a pair of arms to which the wipers are respectively secured, carriers on which said arms are respectively mounted for swinging movement about axes extending substantially longitudinally of the last, and means for moving said carriers thereby to impart bodily movement to said arms heightwise of the last toward the top of the last and for simultaneously swinging said arms about their axes thereby to move the wipers inwardly over the top of the last.

10. In a machine for shaping moccasins over lasts, means for lasting the toe end of a moccasin bottom, wipers constructed and arranged to operate locally on the sides of the forepart of the moccasin bottom, and cam actuated means for moving the wipers heightwise of the last toward the top of its forepart and simultaneously inwardly over the top of the last.

11. In a machine for shaping moccasins over lasts, means for lasting the toe end of a moccasin bottom, wipers constructed and arranged to operate locally on the sides of the forepart of the moccasin bottom, and cam actuated means for moving the wipers heightwise of the last toward the top of its forepart and simultaneously inwardly over the top of the last and to hold the wipers against the moccasin bottom after they have been advanced to the limit of the overwiping movement.

12. In a machine for shaping moccasins over lasts, a rest for the forepart of a last in substantially upright position with a moccasin bottom thereon, and means constructed and arranged to hold the forepart of the moccasin bottom against the forepart of the last while simultaneously holding the last down against said rest.

13. In a machine for shaping moccasins over lasts, a rest for the forepart of a last and moccasin parts thereon arranged substantially in upright position, and a plurality of clamping members for holding the forepart of a moccasin bottom against the forepart of the last while simultaneously holding the last down against said rest.

14. In a machine for shaping moccasins over lasts, a support, a flexible lasting member for working a moccasin bottom heightwise of a last on said support, and means constructed and arranged to be positioned in engagement with the top of the forepart of the last and in predetermined and constant relation to the last for limiting the advance of said flexible lasting member.

15. In a machine for shaping moccasins over lasts, a support for a last with a moccasin bottom thereon, a flexible lasting member for working the foreparts of the moccasin bottom heightwise of the last, an abutment plate for limiting the advance of said flexible lasting member, and means for causing the plate to register with a predetermined part of the top of the forepart of the last.

16. In a machine for shaping moccasins over lasts, a support for a last with a moccasin bottom thereon, a flexible lasting member for working the forepart of the moccasin bottom heightwise of the last, an abutment plate for limiting the advance of said flexible lasting member, and pin-and-socket connections between the plate and the last for causing the plate to register with a predetermined area of the top of the forepart of the last.

17. In a machine for shaping moccasins over lasts, means for supporting the forepart of a last with a moccasin bottom thereon, a flexible lasting member for working the moccasin bottom heightwise of the last, and means for moving the last lengthwise thereof on its support into engagement with the flexible lasting member.

18. In a machine for shaping moccasins over lasts, a rest for the forepart of a last with a moccasin bottom thereon, a clamp constructed and arranged to engage the heel end of the last, a flexible lasting member for working the forepart of the moccasin bottom heightwise of the last, and means for moving the clamp lengthwise of the last thereby to advance the last into operative relation to the flexible lasting member.

19. In a machine for shaping moccasin bottoms over lasts, means for supporting a last with a moccasin bottom thereon in substantially upright position, a flexible lasting member for shaping the forepart of the moccasin bottom to the forepart of the last, and spreading means constructed and arranged to press the margin of the forepart of the moccasin bottom against the flexible lasting member after said margin has been turned outwardly over said member.

20. In a machine for shaping moccasins over lasts, means for supporting a last with a moccasin bottom thereon, a lasting member constructed and arranged to conform to the contours of the forepart of the last, and a spreader for yieldingly pressing the margin of the moccasin bottom against the lasting member after said margin has been turned outwardly over said member.

21. In a machine for shaping moccasins over lasts, a support for a last with a moccasin bottom thereon, a lasting member constructed and arranged to conform to the contours of the forepart of the last, and a spreader constructed and arranged to press the margin of the forepart of the moccasin bottom against the lasting member after said margin has been turned outwardly over said member and to retard the movement of the outturned margin of the moccasin bottom inwardly over the top of the forepart of the last during the advance of the lasting member.

22. In a machine for shaping moccasins over lasts, a support for a last with a moccasin bottom thereon, a lasting cable constructed and arranged to conform to the contours of the forepart of the last, and a spreader constructed and arranged to press the margin of the forepart of the moccasin bottom against the lasting cable after said margin has been turned outwardly over said cable and to retard the movement of the outturned margin of the moccasin bottom inwardly over the top of the forepart of the last during the advance of the lasting cable.

23. In a machine for shaping moccasins over lasts, a support for a last with a moccasin bottom thereon, a lasting wire constructed and arranged to conform to the contours of the forepart of the last, a spreader constructed and arranged to press the margin of the forepart of the moccasin bottom against the lasting wire after said margin has been turned outwardly over said wire and to retard the movement of the outturned margin of the moccasin bottom inwardly over the top of the forepart of the last during the advance of the lasting wire, and an abutment member carried by the spreader and constructed and arranged to limit the advance of the wire.

24. In a machine for shaping moccasin bottoms over lasts, means for supporting a last with a moccasin bottom thereon in substantially upright position, a flexible lasting member for shaping the forepart of the moccasin bottom to the forepart of the last, a spreader constructed and arranged to press the margin of the forepart of the moccasin bottom against the flexible lasting member after said margin has been turned outwardly over said member, and connections between the spreader and the last for locating the spreader in predetermined and constant relation to the forepart of the last.

25. In a machine for shaping moccasins over lasts, means for working the forepart of a moccasin bottom heightwise thereof toward the top of the forepart of the last, and a spreader for pressing the margin of the moccasin bottom against said lasting means after said margin has been turned outwardly over the lasting means, said spreader being constructed and arranged to be supported upon the top of the forepart of the last when the spreader is in its upper-engaging position.

26. In a machine for shaping moccasins over lasts, means for working a moccasin bottom heightwise of the last toward the top of the last, a spreader for pressing the outturned margin of the moccasin bottom against said lasting means, and means for effecting registration of the spreader with a predetermined area at the top of the forepart of the last.

27. In a machine for shaping moccasins over lasts, means for working a moccasin bottom heighthwise of the last toward the top of the last, a spreader constructed and arranged to press the margin of the moccasin bottom against the lasting means after said margin has been turned outwardly over the lasting means, a carrier for the spreader movable toward and from a predetermined location on the top of the forepart of the last, said spreader being constructed and arranged to adjust itself to the forepart of the last.

28. In a machine for shaping moccasins over lasts, means for working a moccasin bottom heightwise of the last toward the top of the last, and a spreader constructed and arranged to press the margin of the moccasin bottom against said lasting means after said margin has been turned outwardly over the lasting means, said spreader comprising a last-engaging member, a series of resiliently yielding members extending outwardly from said last-engaging member and upper-engaging means carried by said yielding members.

29. In a machine for shaping moccasins over lasts, means for working a moccasin bottom heightwise of the last toward the top of the last, and a spreader constructed and arranged to press the margin of the moccasin bottom against said lasting means after said margin has been turned outwardly over the lasting means, said spreader comprising a last-engaging member, a series of resiliently yielding members extending outwardly from said last-engaging member, and an upper-engaging sheet carried by said yielding members.

30. In a machine for shaping moccasins over lasts, a lasting wiper for working a moccasin bottom heightwise of the last toward the top of the last, and a spreader for pressing the margin of the forepart of the moccasin bottom against said wiper after said margin has been turned outwardly over said wiper, said spreader comprising a central member constructed and arranged to engage the top of the forepart of the last, arms pivoted to said central member and extending outwardly therefrom, and an upper-engaging sheet carried by said arms.

31. In a machine for shaping moccasins over lasts, a lasting wiper for working a moccasin bottom heightwise of the last toward the top of the last, and a spreader for pressing the margin of the forepart of the moccasin bottom against said wiper after said margin has been turned outwardly over said wiper, said spreader comprising a central member constructed and arranged to engage the top of the forepart of the last, arms pivoted to said central member and extending outwardly therefrom, an upper-engaging sheet carried by said arms, and means carried by said central member for urging said arms toward the outturned margin of the moccasin bottom.

32. In a machine for shaping moccasins over lasts, a lasting wiper for working a moccasin bottom heightwise thereof toward the top of the last, and a spreader for pressing the margin of the moccasin bottom against said wiper after said margin has been turned outwardly over said wiper, said spreader comprising a central member constructed and arranged to provide an abutment against which the moccasin bottom is lasted, a series of presser members carried by said central member and extending outwardly therefrom, and upper-engaging means carried by said presser members.

33. In a machine for shaping moccasins over lasts, a lasting wiper for working a moccasin bottom heightwise thereof toward the top of the last, and a spreader for pressing the margin of the moccasin bottom against said wiper after said margin has been turned outwardly over said wiper, said spreader comprising a central member constructed and arranged to provide an abutment against which the moccasin bottom is lasted, a series of presser members carried by said central member and extending outwardly therefrom, and an upper-engaging sheet carried by said presser members.

34. In a machine for shaping moccasins over lasts, a lasting wiper for working a moccasin bottom heightwise of the last toward the top of the last, and a spreader for pressing the margin of the moccasin bottom against the lasting wiper after said margin has been turned outwardly over said wiper, said spreader comprising a central member providing an abutment for limiting the advance of the lasting wiper, means for effecting registration of said central member with a predetermined area of the top of the last, a series of presser feet pivoted to said central member and extending outwardly therefrom, and means for urging said presser feet toward the top of the last.

35. In a machine for shaping moccasins over lasts, a lasting member for working the forepart of a moccasin bottom heightwise thereof toward the top of the last, and a spreader for pressing the margin of the moccasin bottom against the lasting member after said margin has been turned outwardly over said lasting member, the upper-engaging face of said spreader being provided with corrugations constructed and arranged to register with said lasting member.

36. In a machine for shaping moccasins over lasts, a lasting member for working the forepart of a moccasin bottom heightwise thereof toward the top of the last, a spreader for pressing the margin of the moccasin bottom against the lasting member after said margin has been turned outwardly over said lasting member, the upper-engaging face of said spreader being provided with corrugations constructed and arranged to register with said lasting member, and a series of upper-engaging grippers mounted on the spreader member.

37. In a machine for shaping moccasins over lasts, a lasting member for working the forepart of a moccasin bottom heightwise thereof toward the top of the last, an abutment member constructed and arranged to be positioned on the top of the forepart of the last to limit the advance of the lasting member, a spreader carried by the abutment member and constructed and arranged to press the margin of the moccasin bottom against the lasting member after said margin has been turned outwardly over said lasting member, and yielding means for holding the spreader against said abutment member.

38. In a machine for shaping moccasins over lasts, a flexible lasting member for working a moccasin bottom heightwise of a last toward the top of the last, and an inflexible clamping member constructed and arranged to engage the moccasin bottom on the last before the lasting member is released and to hold the moccasin bottom in lasted position.

39. In a machine for shaping moccasins over lasts, a lasting member constructed and arranged to conform to the contours of the forepart of the last, and an inflexible clamping member constructed and arranged to engage a moccasin bottom on a last along a line adjacent to the lasting member after said member has reached the limit of its advancement.

40. In a machine for shaping moccasins over lasts, a shoe support, a flexible lasting member for working a moccasin bottom heightwise of a last, means constructed and arranged to be positioned in engagement with the top of the forepart of the last and in predetermined and constant relation to the last for limiting the advance of said flexible lasting member, and means constructed and arranged to engage the lasted moccasin bottom beneath and adjacent to the flexible lasting member when said member is in the limit of its advancement, thereby to clamp the moccasin bottom in lasted position.

41. In a machine for shaping moccasins over lasts, a support for a last with a moccasin bottom thereon, a flexible lasting member for working the forepart of the moccasin bottom heightwise of the last, an abutment plate for limiting the advance of said flexible lasting member, means for causing the plate to register with a predetermined area of the top of the forepart of the last, and inflexible clamping plates constructed and arranged to engage the lasted moccasin bottom beneath and adjacent to the flexible lasting member after said member has been arrested by the abutment plate.

42. In a machine for shaping moccasins over lasts, means for supporting a last and a moccasin bottom thereon, a flexible lasting member constructed and arranged to work the forepart of the moccasin bottom heightwise thereof toward the top of the last, a spreader for yieldingly pressing the margin of the moccasin bottom against the lasting member after said margin has been turned outwardly over said lasting member, and forepart-embracing clamping means constructed and arranged to engage the lasted moccasin bottom while the moccasin bottom is held in lasted position by the lasting member and the spreader and to secure it in lasted position.

43. In a machine for shaping moccasins over lasts, means for supporting a last and a moccasin bottom thereon, a flexible lasting member constructed and arranged to work the forepart of the moccasin bottom heightwise thereof toward the top of the last, a spreader for yieldingly pressing the margin of the moccasin bottom against the lasting member after said margin has been turned outwardly over said lasting member, and forepart-embracing inflexible clamping plates constructed and arranged to engage the lasted moccasin bottom while the moccasin bottom is held in lasted position by the lasting member and the spreader and to secure it in lasted position.

44. In a machine for shaping moccasins over lasts, a flexible lasting member for working the forepart of a moccasin bottom heightwise of the last toward the top of the last, a clamping member constructed and arranged to engage the moccasin bottom on the last before the lasting member is released and to hold the moccasin bottom in lasted position, and means for adjusting the clamping member heightwise of the last.

45. In a machine for shaping moccasins over lasts, means for working the forepart of a moccasin bottom heightwise of a last toward the top of the last, co-operating forepart-embracing clamping plates constructed and arranged to engage the periphery of the forepart of the last along a line adjacent to the top face of the last, and means for adjusting said plates in a direction generally heightwise of the last.

46. In a machine for shaping moccasins over lasts, means for working the forepart of a moccasin bottom heightwise of a last toward the top of a last, a clamping member constructed and arranged to engage the periphery of the forepart of the last along a line substantially adjacent to the top of the forepart of the last, a head in which the clamping member is mounted for movement generally lengthwise of the last, said head being mounted to swing on an axis extending transversely of the longitudinal median line of the forepart of the last and spaced forwardly of the last from its toe end.

47. In a machine for shaping moccasins over lasts, means for working the forepart of a moccasin bottom heightwise of the last toward the top of the last, a clamping member constructed and arranged to engage the periphery of the forepart of the last along a line substantially adjacent to the top of the forepart of the last, a head in which the clamping member is mounted for movement generally lengthwise of the last, said head being mounted to swing on an axis extending transversely of the longitudinal median line of the forepart of the last and spaced forwardly of the last from its toe end, yielding means for swinging said head about its axis thereby to lift the clamping member into a position remote from the last, and means for locking said head in a position wherein the clamping member is arranged to engage the last.

48. In a machine for shaping moccasins over lasts, a forepart-lasting wiper comprising a tension member having side portions constructed and arranged to conform to the contours of the forepart of the last, and means constructed and arranged to engage the toe-lasting portion of the wiper and to tension said toe-lasting portion generally widthwise of the last while simultaneously tensioning the side portions of the wiper generally lengthwise of the last from its heel end toward its toe end.

49. In a machine for shaping moccasins over lasts, a lasting cable constructed and arranged to conform to the contours of the forepart of the last, a series of tensioning members arranged about the toe end of a last in the machine, and connections between said tensioning members and the lasting cable whereby the cable is drawn forwardly of the last while the side portions of the cable are substantially spaced from each other.

50. In a machine for shaping moccasins over lasts, a lasting wiper constructed and arranged to conform to the contours of the forepart of the last, a series of members arranged about the toe end of the last, each of said members being movable in a path generally radial to the curvature of the toe end of the last, connections between said member and the wiper, and means for yieldingly urging said members away from the last.

51. In a machine for shaping moccasins over lasts, a lasting cable constructed and arranged to conform to the contours of the forepart of the last, a series of members arranged about the toe end of a last in the machine, each of said members being movable in a path generally radial to the curvature of the toe end of the last, means constructed and arranged to connect the cable to said members and to provide a cover for the toe-engaging portion of the cable, and means for yieldingly urging said members away from the last.

52. In a machine for shaping moccasins over lasts, a lasting wiper constructed and arranged to conform to the contours of the forepart of the last, a series of fingers arranged about the toe end of a lasting machine and yieldingly urged away from the last, and a replaceable connection between the toe-engaging portion of the wiper and said fingers.

53. In a machine for shaping moccasins over lasts, a lasting member constructed and arranged to conform to the contours of the forepart of the last, and a holddown constructed and arranged to maintain wiping engagement of the lasting member with a moccasin bottom on the last throughout that portion of the lasting margin on which the lasting member operates.

54. In a machine for shaping moccasins over lasts, a lasting cable constructed and arranged to conform to the contours of the forepart of the last, and a fixed holddown constructed and arranged to maintain wiping engagement of the lasting cable with a moccasin bottom on the last.

55. In a machine for shaping moccasins over lasts, a lasting member constructed and arranged to conform to the contours of the forepart of the last, means for supporting the toe-embracing end of the lasting member, and a holddown for the lasting member constructed and arranged to engage said supporting means and to maintain wiping engagement of the lasting member with a moccasin bottom on the last.

56. In a machine for shaping moccasins over lasts, a flexible lasting cable constructed and arranged to conform to the contours of the forepart of the last, a cable holddown arranged to encircle the toe end of the last, and means for supporting the toe-engaging portion of the cable, said supporting means being arranged to underlie the holddown and to co-operate with the holddown to maintain wiping engagement of the cable with a moccasin bottom on the last.

57. In a machine for shaping moccasins over lasts, a lasting wiper constructed and arranged to conform to the contours of the forepart of the last, a flexible member extending forwardly from the toe-engaging portion of the wiper for holding the wiper in last-engaging position, and a holddown constructed and arranged to overlie said flexible member along a line adjacent to the toe-engaging portion of the wiper, thereby to maintain wiping engagement of the wiper with a moccasin bottom on the last.

58. In a machine for shaping moccasins over lasts, means for working the forepart of a moccasin bottom heightwise thereof toward the top of the forepart of a last, and means for pressing a clamping member against the overlasted margin of the forepart of the moccasin.

59. In a machine for shaping moccasins over lasts, means for working the forepart of a moccasin bottom heightwise thereof toward the top of the forepart of a last, and a depressor constructed and arranged to apply pressure in a direction heightwise of the last to a clamping plate mounted on the overlasted margin of the moccasin bottom.

60. In a machine for shaping moccasins over lasts, means for working the forepart of a moccasin bottom heightwise thereof toward the top of the forepart of a last, a depressor constructed and arranged to apply pressure in a direction heightwise of the last to a clamping plate mounted on the overlasted margin of the moccasin bottom, a cam for actuating the depressor, and a cam follower carried by the depressor and arranged to be positioned to be engaged by the cam by movement of the depressor into position to engage the clamping plate.

61. In a machine for shaping moccasins over lasts, a carrier for a last with moccasin parts thereon arranged in substantially upright position, means for effecting rectilinear movement of the carrier lengthwise of the last, and means constructed and arranged for engagement with the toe end of the moccasin on the last thereby to determine the operative position of the last in the machine.

62. In a machine for shaping moccasins over lasts, means for supporting a last with moccasin parts thereon in substantially upright position, a carrier for the last, means mounted in the carrier for clamping the heel portion of the last thereto, means for moving the carrier lengthwise of the last, and a fixed stop for arresting the advance of the carrier and the last clamped thereto.

63. In a machine for shaping moccasins over lasts, a bed for supporting the forepart of a last with moccasin parts thereon in substantially upright position, a carrier for the last slidably mounted in the bed for movement lengthwise of the last, means for moving the carrier lengthwise of the last, and means for arresting the carrier with the toe end of the last in a predetermined position in the machine.

64. In a machine for shaping moccasins over lasts, a support for a last arranged substantially in upright position with moccasin parts thereon, said support comprising a toe rest and a heel clamp mounted on the toe rest for movement lengthwise of the last, and a stop for positioning the last lengthwise thereof with its toe end in a predetermined position in the machine.

65. That method of making moccasins which consists in shaping the forepart of a moccasin bottom over a last and while the moccasin bottom is held in lasted position in the lasting machine, securing to the top of the forepart of the last a clamping member constructed and arranged to engage the excess margin of the forepart of the lasted moccasin bottom, thereafter trimming said excess margin from the moccasin bottom, removing the clamping block, positioning a toe-piece on the top of the forepart of the last, and securing its edge face to the trimmed edge of the moccasin bottom.

66. That method of making moccasins which consists in shaping the forepart of a moccasin bottom over a last, securing to the top of the forepart of the last a clamping block providing a trimming gage, the margin of said block engaging the excess margin of the forepart of the moccasin bottom and securing it to the top of the last, trimming the forepart of the moccasin bottom, cementing the edge face of a toe-piece to the trimmed edge face of the moccasin bottom on the last, then removing the last and permanently securing the toe-piece to the moccasin bottom.

67. That method of making moccasins which comprises shaping a moccasin bottom over a last, thereafter, while the moccasin bottom is held in lasted position, securing in a predetermined position on the top of the forepart of the last a clamping block having an edge formed to serve as a trimming gage, the margin of said block engaging the excess margin of the moccasin bottom and clamping it to the top of the last, trimming the forepart of the moccasin bottom along the line defined by the edge of the clamping block, and thereafter securing a toe-piece to the forepart of the moccasin bottom.

68. That method of making moccasins which consists in shaping the forepart of a moccasin bottom over a last, thereafter, while the moccasin bottom is held in lasted position, applying to the top of the forepart of the last a clamping member constructed and arranged to clamp the excess margin of the moccasin bottom against the top of the last, disengaging the last together with the moccasin parts from the means for holding it in lasted position, clamping the upturned portion of the moccasin bottom to the periphery of the last, cutting off the excess margin of the forepart of the moccasin bottom, and securing a toe-piece to the top of the moccasin bottom.

69. That method of making moccasins which comprises shaping the forepart of a moccasin bottom over a last, thereafter, while the moccasin bottom is held in lasted position, securing in a predetermined position on the top of the forepart of the last a clamping block having an edge formed to serve as a trimming gage, the margin of said block securing the excess margin of the moccasin bottom to the top of the last, securing to the last a forepart-embracing member constructed and arranged to clamp the upturned portion of the moccasin bottom to the periphery of the forepart of the last, trimming the forepart of the moccasin bottom along the line defined by the edge of the clamping block, disengaging the block from the last, positioning a toe-piece on top of the forepart of the last, and securing the edge face of the toe-piece to the edge face of the moccasin bottom.

FRED ASHWORTH.